(12) United States Patent
Hashizume

(10) Patent No.: US 7,444,262 B2
(45) Date of Patent: Oct. 28, 2008

(54) REVERSE ROTATION DETECTOR FOR INTERNAL COMBUSTION ENGINE

(75) Inventor: Katsushi Hashizume, Gamagori (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 12 days.

(21) Appl. No.: 11/630,211

(22) PCT Filed: Jul. 20, 2005

(86) PCT No.: PCT/JP2005/013686

§ 371 (c)(1),
(2), (4) Date: Dec. 21, 2006

(87) PCT Pub. No.: WO2006/009298

PCT Pub. Date: Jan. 26, 2006

(65) Prior Publication Data

US 2008/0010037 A1 Jan. 10, 2008

(30) Foreign Application Priority Data

Jul. 20, 2004 (JP) ............................. 2004-211721

(51) Int. Cl.
*G01P 3/00* (2006.01)
*G06F 15/00* (2006.01)

(52) U.S. Cl. ..................................... 702/151; 702/145

(58) Field of Classification Search ................. 702/127, 702/145, 147, 151; 123/179.4, 631, 197.4; 73/117.2

See application file for complete search history.

(56) References Cited

U.S. PATENT DOCUMENTS

| 4,403,193 | A | 9/1983 | Takemura |
| 4,854,284 | A | 8/1989 | Hara et al. |
| 6,435,158 | B1* | 8/2002 | Mingo et al. ............ 123/198 D |
| 6,701,275 | B1 | 3/2004 | Muratomi |
| 2003/0106364 | A1* | 6/2003 | Kimata et al. .............. 73/118.1 |
| 2004/0159297 | A1* | 8/2004 | Kataoka et al. .......... 123/179.4 |

FOREIGN PATENT DOCUMENTS

| EP | 0 286 398 A2 | 10/1988 |
| EP | 1 186 894 A1 | 3/2002 |
| JP | A 7-247833 | 9/1995 |
| JP | A 2000-205026 | 7/2000 |
| JP | A 2001-214791 | 8/2001 |
| JP | A 2003-083146 | 3/2003 |

* cited by examiner

*Primary Examiner*—Bryan Bui
(74) *Attorney, Agent, or Firm*—Oliff & Berridge, PLC

(57) ABSTRACT

A crank angle sensor outputs a pulse signal whenever a crankshaft rotates a predetermined angle. An ECU performs an elimination process on a sequence of pulse signals to obtain a remaining signal used to determine the crank angle. When the rotation speed of the crankshaft becomes lower than a predetermined threshold, the ECU suspends the elimination process and determines the crank angle using pulse signals that have not undergone the elimination process. The ECU detects reverse rotation of the crankshaft based on pulse signals that have not undergone the elimination process. A crank counter is operated in synchronism with the falling of a pulse signal when the crankshaft rotates in the forward direction and is operated in synchronism with the rising of a pulse signal when the crankshaft rotates in the reverse direction.

14 Claims, 10 Drawing Sheets

Forward Rotation Direction

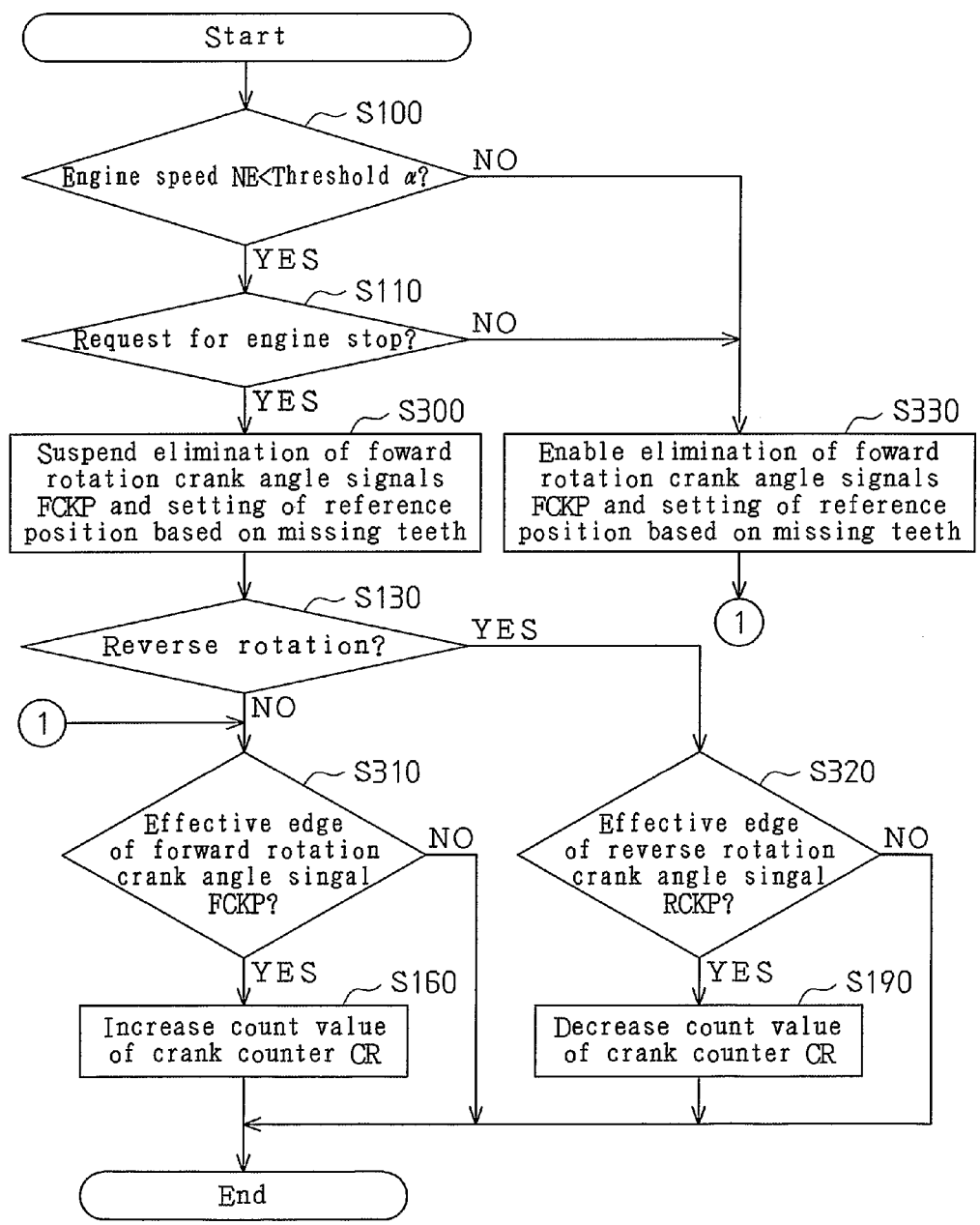

REVERSE ROTATION DETECTOR FOR INTERNAL COMBUSTION ENGINE

FIELD OF THE INVENTION

The present invention relates to a reverse rotation detector for an internal combustion engine.

BACKGROUND OF THE INVENTION

In an internal combustion engine, the position of a piston, which is arranged in each cylinder, is typically detected based on the rotation angle of a crankshaft, which is an output shaft of the engine. The rotation angle of the crankshaft is referred to as a crank angle (° CA). Various settings, such as the fuel injection timing and the ignition timing, are associated with the crank angle.

The crank angle is detected, for example, by a crank rotor and a crank angle sensor. The crank rotor is arranged on the crankshaft. The crank angle sensor is arranged to face the crank rotor.

The crank rotor includes a plurality of teeth and a teeth missing portion. The teeth are arranged at equal angular intervals in the rotation direction of the crankshaft. The teeth missing portion is defined at a portion in which a predetermined number of teeth are missing. Each tooth passes a position facing the crank angle sensor as the crank rotor rotates. Whenever detecting the passage of a tooth, the crank angle sensor outputs a pulse signal. When the teeth missing portion passes the position facing the crank angle sensor, the crank angle sensor outputs a reference position signal that differs from the pulse signal. The rotational angular position of the crankshaft at the timing when the reference position signal is output is set as a reference position. A crank counter counts the number of pulse signals output from the crank angle sensor after the reference position signal is output. The rotation angle of the crankshaft from the reference position, or the crank angle, is detected based on the counted number of pulse signals.

The crankshaft rotates in one direction when the engine is driven. However, when the engine is stopped, the rotation direction of the crankshaft may be reversed immediately before the crankshaft stops rotating. Hereafter, the rotation of the crankshaft when the engine is driven is referred to as "forward rotation".

As described above, the number of pulse signals output from the crank angle sensor is counted and the crank angle is detected based on the counted number of pulse signals. If the rotation of the crankshaft is reversed when the engine is stopped, the number of pulse signals output during the reverse rotation must be subtracted from the counted number of pulse signals. However, the number of pulse signals output during the reverse rotation is instead added to the counted number of pulse signals. As a result, the crank angle that is recognized when the engine is stopped is inaccurate. Accordingly, when the engine is started again, the recognized crank angle, which indicates the position of each piston, remains inaccurate until the reference position signal is detected. Thus, fuel injection and ignition cannot be performed until the reference position signal is detected and the crank angle is accurately recognized.

If the reverse rotation of the crankshaft is detectable, it is possible to determine the timing at which the number of pulse signals is subtracted from the counted number of pulse signals. In this case, it is possible to obtain the position where the crankshaft stops when the engine is stopped. In other words, it is possible to determine the crank angle of the crankshaft when the engine is stopped. If it is possible to detect the crank angle when the engine is stopped, it is also possible to readily determine the crank angle when the engine is started again. This would enable fuel injection and ignition to be performed before detection of the reference signal. This would improve engine characteristics, such as engine startability.

Japanese Laid-Open Patent Publication No. 2001-214791 describes an apparatus that detects reverse rotation of the crankshaft in the manner described below. If rotation of the crankshaft is reversed when the engine is stopped, the engine speed decreases gradually and reaches zero. Then the engine speed starts increasing when the reverse rotation begins. Such changes in the engine speed are reflected in the duration of the pulse signal. The apparatus detects reverse rotation of the crankshaft when the length of the time of the pulse signal reaches a maximum value, that is, when the time length begins to decrease after having been increasing.

The crank angle may be detected based on pulse signals remaining after a signal elimination process. The signal elimination process eliminates a predetermined proportion of pulse signals from the sequence of pulse signals that are output at equal angular intervals during rotation of the crankshaft to obtain a remaining signal, which is used to detect the crank angle.

For example, when the teeth of the crank rotor are arranged at an angular interval of 10°, a pulse signal is output at every crank angle of 10° CA. The crank counter is operated based on a remaining signal obtained by eliminating two out of every three successive pulse signals. In this case, the counter is operated at every crank angle of 30° CA. Thus, the load on a processor for detecting the crank angle is reduced as compared with when the counter is operated at every crank angle of 10° CA, that is, when the signal elimination process is not performed. This enables the crank angle to be detected without the need for a high-speed processor.

When the signal elimination process is performed, the load on the processor for detecting the crank angle is reduced. However, when the signal elimination process is performed, the detection resolution of the crank angle is lowered. This may result in inaccurate detection of reverse rotation if the apparatus of Japanese Laid-Open Patent Publication No. 2001-214791 performs the signal elimination process. More specifically, if the apparatus recognizes reverse rotation of the crankshaft by detecting a change in a pulse signal when reverse rotation begins, the signal elimination process may hinder detection of this change in the pulse signal. As a result, the apparatus may fail to accurately detect the reverse rotation. To avoid such a state, the reverse rotation detection process in the prior art requires high detection resolution for the crank angle. This inevitably increases the load for detecting the crank angle.

The above counter is operated when a pulse signal is output. In other words, the counter is operated at a timing that is synchronized with a shift in the output level of the pulse signal. However, if the counter is operated in accordance with either the rise timing or the fall timing of the pulse signal regardless of whether the crankshaft is in forward rotation or reverse rotation, the crank angle fails to be detected accurately during reverse rotation of the crankshaft. An example in which such a deficiency occurs will be described with reference to FIG. 11. Here, the rise of the pulse signal refers to a shift in the pulse signal from a low level to a high level, and the fall of the pulse signal refers to a shift in the pulse signal from a high level to a low level.

FIG. 11 shows an example in which a deficiency occurs under conditions (a) to (d) as described below.

(a) The crank angle sensor outputs a low level signal when detecting a tooth (ridge section) of the crank rotor, and outputs a high level signal when detecting the section between adjacent teeth (valley section) of the crank rotor.

(b) During forward rotation of the crankshaft, the count value of the crank counter is increased when a pulse signal falls, that is, when an output signal of the crank angle sensor falls. During reverse rotation of the crankshaft, the count value of the crank counter is decreased when the pulse signal falls.

(c) The teeth of the crank rotor are arranged at angular intervals of 10°.

(d) In the crank rotor, the actual crank angle corresponding to the tooth indicated by A in FIG. 11 is 110° CA.

As shown in FIG. 11, during forward rotation of the crankshaft, the output of the sensor falls when one edge (first edge) A1 of the tooth A passes the position facing the crank angle sensor, and the output of the sensor rises when the other edge (second edge) A2 of the tooth A passes the position facing the crank angle sensor. Then, when the crankshaft rotates by a crank angle of 10° CA after the first edge A1 of the tooth A passes the position facing the crank angle sensor and the actual crank angle becomes 120° CA, a first edge B1 of the tooth B, which is arranged adjacent to the tooth A, passes the position facing the crank angle sensor so that the output of the sensor falls. In this manner, the count value of the crank counter is increased and 10° CA is added to the crank angle whenever the output of the sensor falls. As a result, when the crank angle detected in correspondence with the first edge A1 of the tooth A is 110° CA, the crank angle detected in correspondence with the first edge B1 of the tooth B is 120° CA. In this case, the actual crank angle and the detected crank angle of the crankshaft coincide with each other.

When the rotation of the crankshaft is reversed after a second edge B2 of the tooth B passes the position facing the crank angle sensor, that is, when rotation of the crankshaft is reversed while the crank angle sensor is detecting a valley section of the crank rotor, the second edge B2 of the tooth B again passes the position facing the crank angle sensor. The crank angle sensor detects passage of the tooth B. The output of the sensor falls in synchronization with passage of the second edge B2. As a result, the count value of the crank counter is decreased. The detected crank angle becomes 110° CA in synchronization with passage of the second edge B2. However, the actual crank angle is 110° CA when the first edge B1 of the tooth B passes the position facing the crank angle sensor. The actual crank angle and the detected crank angle deviate from each other by a value corresponding to the width of the tooth B. The detected crank angle is based on the value of the crank counter that decreased at a timing earlier than the timing corresponding to the actual crank angle. If the rotation of the crankshaft is reversed when the crank angle sensor is detecting a ridge section of the crank rotor, the detected crank angle is based on the value of the crank counter that decreased at a timing delayed from the timing corresponding to the actual crank angle.

In this way, if the crank counter increases or decreases in accordance with the fall timing of the pulse signal regardless of the rotation direction of the crankshaft, the crank counter is operated in accordance with the detection of a different tooth edge depending on whether the crankshaft is in forward rotation or reverse rotation. In other words, the crank angle corresponding to the fall signal during forward rotation of the crankshaft and the crank angle corresponding to the fall signal during reverse rotation of the crankshaft deviate from each other. Thus, the actual crank angle and the detected crank angle deviate from each other during reverse rotation of the crankshaft. As a result, the crank angle fails to be detected accurately. In the same manner, the crank angle also fails to be detected accurately during reverse rotation of the crankshaft when the count value of the crank counter increases or decreases at the rise timing of the pulse signal.

Conditions (a) to (d) are merely examples. Conditions differing from conditions (a) to (d) may be set. Even under different conditions, the crank angle may fail to be detected accurately during reverse rotation of the crankshaft if the counter is operated in accordance with either the rise timing or the fall timing of the pulse signal regardless of whether the crankshaft is in forward rotation or reverse rotation.

The crank angle may be detected accurately during reverse rotation of the crankshaft by monitoring both the rise and the fall of the pulse signal or by inverting the waveform of the pulse signal when reverse rotation of the crankshaft is detected. However, this would increase the load for detecting the crank angle.

SUMMARY OF THE INVENTION

It is an object of the present invention to provide a reverse rotation detector for an internal combustion engine with improved accuracy for detecting reverse rotation of an output shaft and for detecting the rotation angle of the output shaft during reverse rotation of the output shaft without increasing the load for such detection.

One aspect of the present invention is a device for use in an internal combustion engine having an output shaft for detecting reverse rotation of the output shaft. The device includes a sensor for outputting a pulse signal whenever the output shaft is rotated by a predetermined angle. A rotation angle calculation unit executes an elimination process, in which a predetermined proportion of pulse signals are eliminated from a sequence of the pulse signals, and determines a rotation angle of the output shaft based on a remaining signal obtained through the elimination process. A reverse rotation detection unit detects reverse rotation of the output shaft based on the pulse signals. When rotation speed of the output shaft becomes lower than a predetermined threshold, the rotation angle calculation unit suspends the elimination process and determines the rotation angle of the output shaft based on the pulse signals that have not undergone the elimination process, and the reverse rotation detection unit detects reverse rotation of the output shaft based on the pulse signals that have not undergone the elimination process.

A further aspect of the present invention is a device for use in an internal combustion engine having an output shaft for detecting reverse rotation of the output shaft. The device includes a sensor for outputting a pulse signal whenever the output shaft is rotated by a predetermined angle. A rotation angle calculation unit includes a counter for performing a count operation in synchronism with rising or falling of the pulse signal. The rotation angle calculation unit determines a rotation angle of the output shaft based on a count value of the counter. A reverse rotation detection unit detects reverse rotation of the output shaft based on the pulse signals. The rotation angle calculation unit has the counter perform the count operation in synchronism with one of the rising and falling of the pulse signal when the output shaft is rotating in a forward direction, and the rotation angle calculation unit has the counter perform the count operation in synchronism with the other one of the rising and falling of the pulse signal when the reverse rotation detection unit detects reverse rotation of the output shaft.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 9 is a flowchart showing a crank counter setting process in the second embodiment;

DETAILED DESCRIPTION OF THE PREFERRED EMBODIMENTS

A reverse rotation detector for an internal combustion engine according to a first embodiment of the present invention will now be described with reference to FIGS. 1 to 6.

Figure 1:
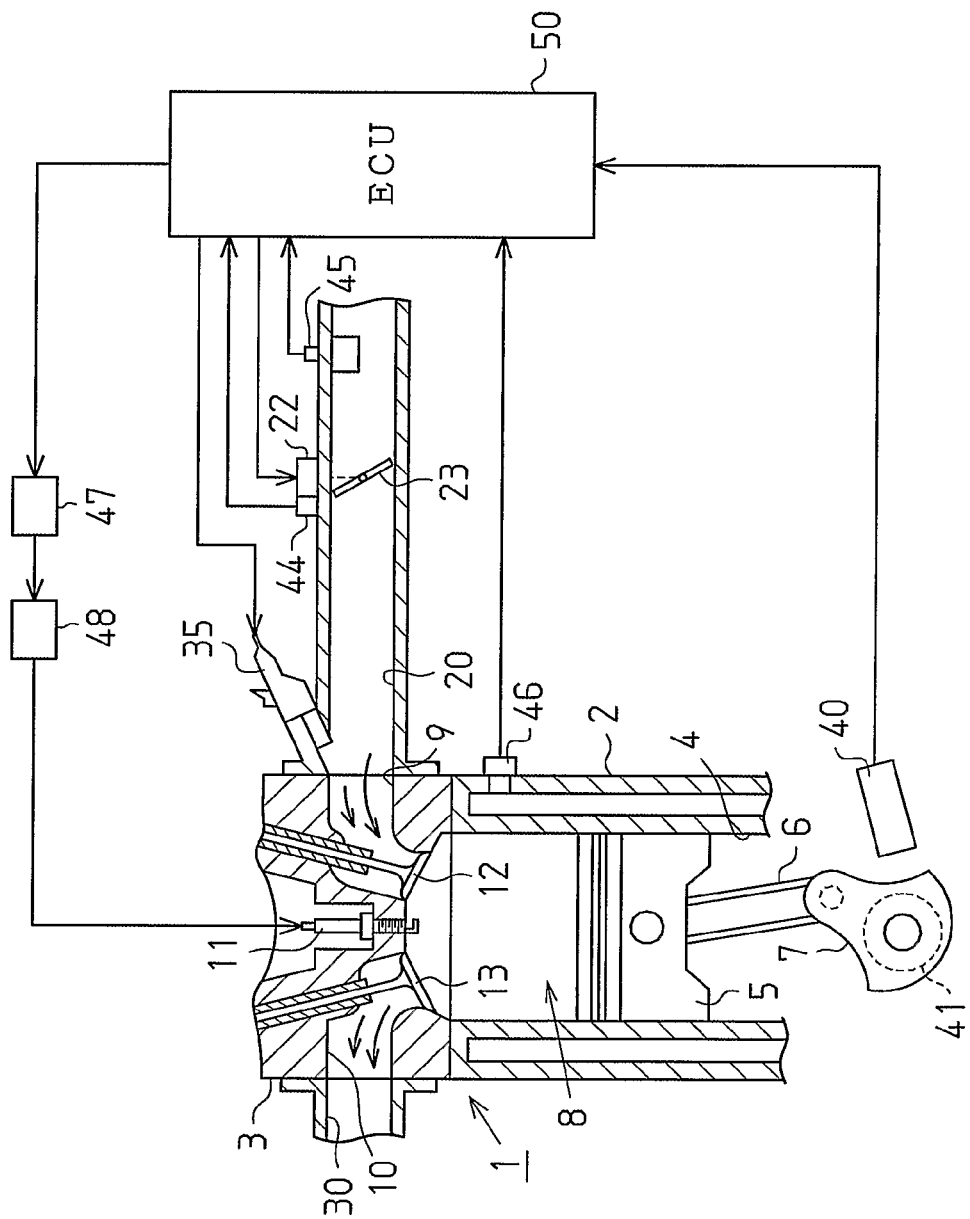
FIG. 1 is a schematic diagram showing the structure of a reverse rotation detector according to a first embodiment of the present invention and the structure of an internal combustion engine to which the reverse rotation detector is applied.

FIG. 1 is a schematic diagram showing the structure of a gasoline engine 1 to which the reverse rotation detector of the first embodiment is applied and its peripheral devices.

A cylinder block 2 of the gasoline engine 1 includes a plurality of cylinders 4 (only one shown in FIG. 1). Each cylinder 4 accommodates a piston 5. Each piston 5 is connected to a crankshaft 7, which is an output shaft of the engine 1, by a connecting rod 6.

A cylinder head 3 is mounted on the upper part of the cylinder block 2. In each cylinder 4, a combustion chamber 8 is formed between the top end of the piston 5 and the cylinder head 3. The cylinder head 3 includes an ignition plug 11 for each cylinder 4 to ignite the air-fuel mixture in the corresponding combustion chamber 8.

The ignition plug 11 is connected to an ignition coil 48. An igniter 47 is connected to the ignition coil 48.

The cylinder head 3 includes an intake port 9 and an exhaust port 10 for each cylinder 4. The intake port 9 functions as a passage for intake air to the combustion chamber 8. The exhaust port 10 provides passage for exhaust from the combustion chamber 8. The intake port 9 has an intake valve 12, which opens and closes the intake port 9. The exhaust port 10 has an exhaust valve 13, which opens and closes the exhaust port 10. Further, a fuel injection valve 35, which is arranged for each cylinder 4, injects fuel into the intake port 9.

The intake port 9 is connected to an intake passage 20. The exhaust port 10 is connected to an exhaust passage 30. A throttle valve 23, of which the opening degree is adjusted by an actuator 22 that is driven based on the operation of an accelerator pedal, is arranged in the intake passage 20. The amount of air introduced into the combustion chamber 8 is adjusted by changing the opening degree of the throttle valve 23.

The gasoline engine 1 further includes various sensors for detecting the driving state of the engine. For example, a crank rotor 41, which rotates integrally with the crankshaft 7, is arranged on the crankshaft 7. A crank angle sensor 40 for detecting the rotation angle of the crankshaft 7, or the crank angle, is arranged in the vicinity of the crank rotor 41. The rotational angular position of the crankshaft 7, or the crank angle, and the engine speed NE are calculated based on the detection signal of the crank angle sensor 40. A throttle opening degree sensor 44, which is arranged in the vicinity of the throttle valve 23, detects the opening degree TA of the throttle valve 23 (throttle opening degree TA). An airflow meter 45, which is arranged upstream from the throttle valve 23, detects an intake air amount QA, which is the amount of intake air flowing to the intake passage 20.

An electronic control unit (ECU) 50 executes various controls for the gasoline engine 1, such as ignition timing control and fuel injection control. The ECU 50 is formed mainly by a microcomputer including a central processing unit (CPU). The ECU 50 includes, for example, a read only memory (ROM) prestoring various programs, maps, etc., a random access memory (RAM) for temporarily storing calculation results of the CPU etc., a timer counter, an input interface, and an output interface.

Output signals from various sensors, such as the crank angle sensor 40, the throttle opening degree sensor 44, the airflow meter 45, and a coolant temperature sensor 46, are input into the input interface. In this way, the sensors are used to detect the driving state of the gasoline engine 1.

The output interface is connected to the fuel injection valve 35, the ignition plug 11, the actuator 22 of the throttle valve 23, etc., via corresponding driving circuits or the like. Based on signals from the above sensors, the ECU 50 controls, for example, fuel injection from the fuel injection valve 35, electric discharge of the ignition plug 11, and driving of the actuator 22. More specifically, various settings, such as the ignition timing using the ignition plug 11 and the fuel injection timing using the fuel injection valve 35, are associated with the detected crank angle.

Crank angle detection in the first embodiment will now be described with reference to FIGS. 2 and 3.

Figure 2:
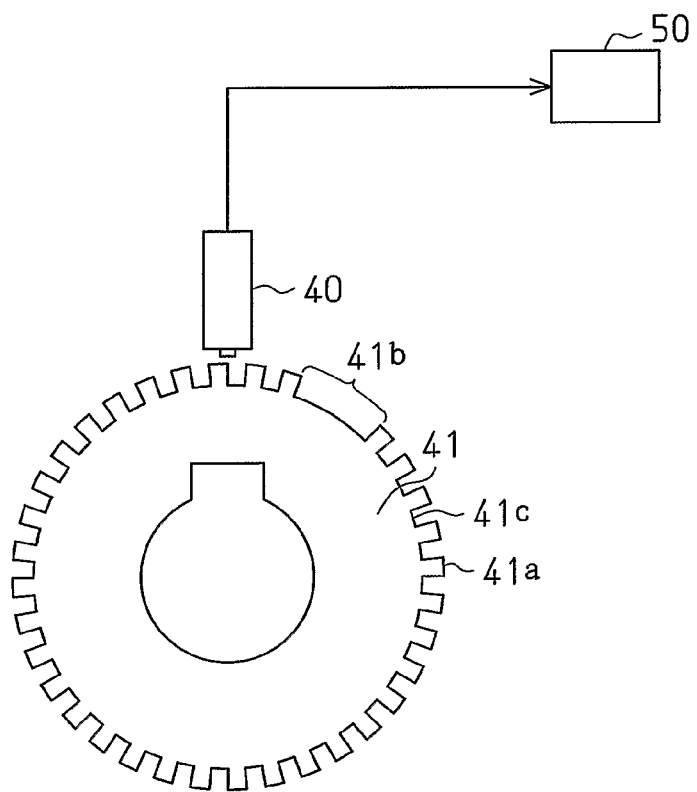
FIG. 2 is a front view showing a crank angle sensor and a crank rotor.

FIG. 2 shows the structure and the arrangement of the crank angle sensor 40 and the crank rotor 41. The crank angle sensor 40 outputs a pulse signal whenever detecting passage of one of a plurality of teeth 41a, which are formed on the circumferential surface of the crank rotor 41. In a state in which thirty six teeth are formed at equal angular intervals on the crank rotor 41, two successive teeth are removed so that the circumferential surface of the crank rotor 41 includes thirty four teeth 41a. The section where the two teeth are removed is referred to as a teeth missing portion 41b. Each section on the circumferential surface of the crank rotor 41 between two adjacent teeth 41a is referred to as a valley section 41c. The number of the teeth 41a and the number of the missing teeth corresponding to the teeth missing portion 41b may be set according to, for example, the detection resolution of the crank angle.

Figure 3:
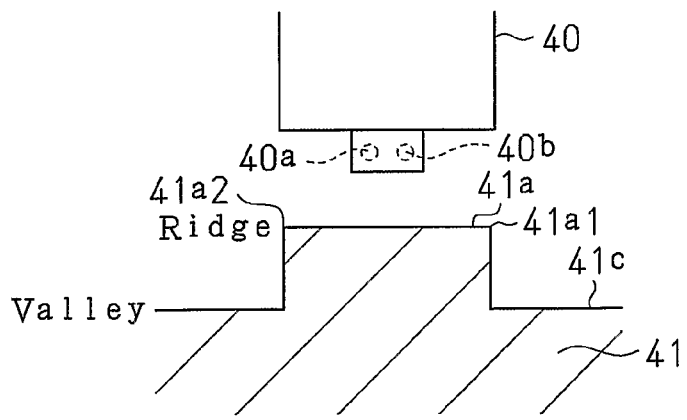
FIG. 3 is a partially enlarged view of detector elements included in the crank rotation sensor shown in FIG. 2.

FIG. 3 shows the arrangement state of detector elements included in the crank angle sensor 40.

As shown in FIG. 3, the crank angle sensor 40 includes a first detector element 40a and a second detector element 40b. The first detector element 40a detects passage of one tooth 41a, and the second detector element 40b then detects passage of the same tooth 41a, which has been detected by the first detector element 40a, during forward rotation of the crankshaft 7.

An output from each of the first and second detector elements 40a and 40b detecting passage of the tooth 41a is subjected to A/D conversion to generate a pulse signal. The first detector element 40a and an A/D converter or the like that converts the output of the first detector element 40a form a first detection unit. In the same manner, the second detector element 40b and an A/D converter or the like that converts the output of the second detector element 40b from a second detection unit.

In the first embodiment, the AD conversion is performed so that the pulse signal is set at a low level while the tooth 41a (ridge section) of the crank rotor 41 is being detected, and the pulse signal is set at a high level while the valley section 41c of the crank rotor 41 is being detected. More specifically, during passage of one tooth 41a, the level of the pulse signal shifts from a high level to a low level when one edge (first edge 41a1) of the tooth 41a, which is positioned frontward relative to the forward rotation direction, is detected, and the level of the pulse signal shifts from a low level to a high level when the other edge (second edge 41a2) of the tooth 41a is detected. In this way, the output level of the pulse signal shifts upon detection of each of the edges 41a1 and 41a2. The pulse signal output based on the detection result of the first detector element 40a is used as a crank angle signal CKP. The A/D conversion may alternatively be performed so that the pulse signal is set at a high level while the tooth 41a (ridge section) of the crank rotor 41 is being detected, and the pulse signal is set at a low level while the valley section 41c of the crank rotor 41 is being detected.

When the crank angle sensor 40 and the crank rotor 41 are used in combination, the crank angle sensor 40 outputs a pulse signal corresponding to each tooth 41a during rotation of the crankshaft 7. In other words, the crank angle sensor 40 outputs a crank angle signal CKP at every crank angle of 10° CA during rotation of the crankshaft 7. During passage of the teeth missing portion 41b, the crank angle sensor 40 outputs a reference position signal indicating passage of the teeth missing portion 41b. In this state, the crank angle sensor 40 outputs a pulse signal for a crank angle of 30° CA. The crank angle sensor 40 outputs a reference position signal at every crank angle of 360° CA. When the reference position signal is output, a crank counter CR of the ECU 50 is reset to zero. Afterwards, the crank counter CR is operated so that its count value is increased by one whenever a crank angle signal CKP is output.

Although a crank angle signal CKP is output for every crank angle of 10° CA, the crank counter CR is operated based on a remaining signal obtained through a signal elimination process. The signal elimination process eliminates two out of every three successive crank angle signals CKP. As a result of the signal elimination process, the crank counter CR is operated at every crank angle of 30° CA. In this case, the calculation load for detecting the crank angle is reduced as compared with when the crank counter CR is operated for every crank angle of 10° CA, that is, when the signal elimination process is not performed. This enables the crank angle to be detected without using a high-speed processor (such as the CPU etc.). The rotation angle of the crankshaft 7, or the crank angle, relative to a reference position is calculated based on the value of the crank counter CR that is operated in the manner described above. The number of signals that are to be eliminated may be set according to, for example, the detection resolution of the crank angle. The crank angle calculation process based on the output signal from the crank angle sensor 40 corresponds to a process executed by a rotation angle calculation unit.

The crankshaft 7 rotates in one direction when the engine 1 is driven. However, when stopping the engine 1, the rotation direction of the crankshaft 7 may be reversed immediately before the crankshaft 7 stops rotating. Thus, it is determined whether the crankshaft 7 is in reverse rotation. During detection of reverse rotation of the crankshaft 7, the crank counter CR is operated so that its count value is decreased by one whenever a crank angle signal CKP is output. In this way, the crank counter CR is operated in a manner that differs depending on whether the crankshaft 7 is in forward rotation or reverse rotation. This enables accurate detection of the crank angle when the engine 1 is stopped.

In the first embodiment, the crank angle detected when the engine 1 is stopped, or more specifically the crank angle detected when the crankshaft 7 stops rotating, is stored in the RAM of the ECU 50. The crank angle stored in the RAM is set as an initial value that is used when the engine 1 is started the next time and the crankshaft 7 starts rotating again. This enables an accurate crank angle to be obtained readily when the engine is started. As a result, when the engine is started, fuel injection and ignition may promptly be performed without waiting until the reference position signal is detected. This improves the engine characteristics, such as startability and exhaust emission.

The detection of reverse rotation in the first embodiment will now be described with reference to FIGS. 4A and 4B.

Figure 4A:
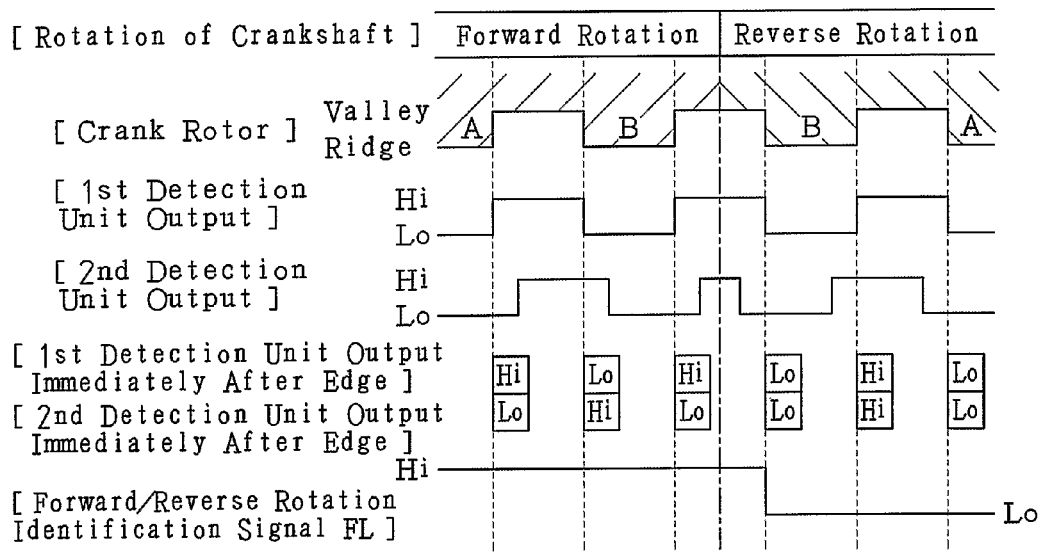
FIG. 4A is an explanatory diagram of the reverse rotation detecting state in the first embodiment in which the crankshaft shifts from forward rotation to reverse rotation while the crank angle sensor is detecting a valley section of the crank rotor.

First, FIG. 4A shows the detection of a state in which rotation of the crankshaft 7 is reversed when the crank angle sensor 40 is detecting the valley section 41c.

As described above, the two detector elements, namely, the first detector element 40a and the second detector element 40b, detect passage of one tooth 41a of the crank rotor 41. During forward rotation of the crankshaft 7, the first detector element 40a first detects the tooth 41a, and then the second detector element 40b detects the same tooth 41a. Thus, during passage of the tooth 41a, the output timing of the pulse signal based on the detection result of the first detector element 40a slightly differs from the output timing of the pulse signal based on the detection result of the second detector element 40b. As shown in FIG. 4A, during forward rotation of the crankshaft 7, one tooth A is first detected by the first detector element 40a, and then the same tooth A is detected by the second detector element 40b. Further, the tooth B, which is arranged adjacent to the detected tooth A, is first detected by the first detector element 40a, and then the same tooth B is detected by the second detector element 40b. During forward rotation of the crankshaft 7, the output level of the first detection unit first shifts from a high level to a low level, and then the output level of the second detection unit shifts from a high level to a low level. Thus, the crankshaft 7 is assumed to be in forward rotation if the output level of the first detection unit and the output level of the second detection unit differ from each other immediately after the output level of the first detection unit shifts, or immediately after an edge. Thus, when the output level of the first detection unit and the output level of the second detection unit differ from each other in this way, the crankshaft 7 is determined as being in forward rotation and a forward/reverse rotation identification signal FL, which indicates the rotation state of the crankshaft 7, is set at a high level.

When rotation of the crankshaft 7 is reversed while the crank angle sensor 40 is detecting the valley section 41c (the output level of the first detection unit and the output level of the second detection unit are both high levels), one tooth B is first detected by the second detector element 40b, and then the same tooth B is detected by the first detector element 40a. The tooth A, which is arranged adjacent to the detected tooth B, is first detected by the second detector element 40b, and then the same tooth A is detected by the first detector element 40a. Thus, during reverse rotation of the crankshaft 7, the output level of the second detection unit first shifts from a high level to a low level, and then the output level of the first detection unit also shifts from a high level to a low level. Thus, the crankshaft 7 is assumed to be in reverse rotation if the output level of the first detection unit and the output level of the second detection unit coincide with each other immediately after the output level of the first detection unit shifts, or immediately after an edge. Thus, when the output level of the first detection unit and the output level of the second detection unit coincide with each other in this way, the crankshaft 7 is determined as being in reverse rotation and the forward/reverse rotation identification signal FL, which indicates the rotation state of the crankshaft 7, is set at a low level.

Figure 4B:
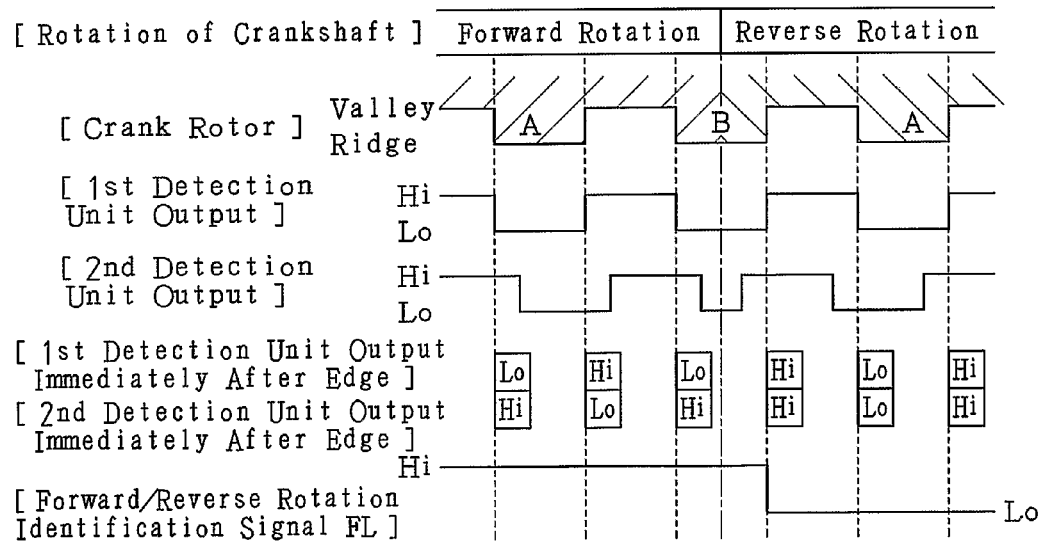
FIG. 4B is an explanatory diagram of the reverse rotation detecting state in the first embodiment in which the crankshaft shifts from forward rotation to reverse rotation while the crank angle sensor is detecting a ridge section of the crank rotor.

Next, FIG. 4B shows the detection in which rotation of the crankshaft 7 is reversed when the crank angle sensor 40 is detecting the tooth 41a (ridge section).

As shown in FIG. 4B, reverse rotation of the crankshaft 7 that occurs when the crank angle sensor 40 is detecting the ridge section is detected in the same manner as when reverse rotation of the crankshaft 7 occurs when the crank angle sensor 40 is detecting the valley section. More specifically, when rotation of the crankshaft 7 is reversed while the crank angle sensor 40 is detecting the tooth 41a (the output level of the first detection unit and the output level of the second detection unit are both low), one valley section 41c formed between the tooth B and the tooth A is first detected by the second detector element 40b, and the same valley section 41c is detected by the first detector element 40a. Subsequently, the tooth A is first detected by the second detector element 40b, and then the same tooth A is detected by the first detector element 40a. Thus, during reverse rotation of the crankshaft 7, the output level of the second detection unit first shifts from a low level to a high level, and then the output level of the first detection unit shifts from a low level to a high level. Thus, the crankshaft 7 is assumed to be in reverse rotation if the output level of the first detection unit and the output level of the second detection unit coincide with each other immediately after the output level of the first detection unit shifts, or immediately after an edge. Thus, when the output level of the first detection unit and the output level of the second detection unit coincide with each other in this manner, the crankshaft 7 is determined as being in reverse rotation and a forward/reverse rotation identification signal FL, which indicates the rotation state of the crankshaft 7, is set at a low level.

In this way, reverse rotation of the crankshaft 7 is detected in the first embodiment based on the corresponding relationship between the output level of the first detection unit and the output level of the second detection unit.

Reverse rotation of the crankshaft 7 is detected in the first embodiment based on the corresponding relationship between the output level of the first detection unit and the output level of the second detection unit immediately after the output level of the first detection unit shifts. Alternatively, reverse rotation of the crankshaft 7 may be detected based on the corresponding relationship between the output level of the first detection unit and the output level of the second detection unit immediately after the output level of the second detection unit shifts. The corresponding relationship between the output levels immediately after the output level of the second detection unit shifts is opposite to the corresponding relationship between the output levels immediately after the output level of the first detection unit shifts. Thus, the crankshaft 7 may be determined as being in reverse rotation when the output level of the first detection unit and the output level of the second detection unit differ from each other immediately after the output level of the second detection unit shifts. Further, the forward/reverse rotation identification signal FL may be set at a low level when the crankshaft 7 is in forward rotation and at a high level when the crankshaft 7 is in reverse rotation. The above-described reverse rotation detection process of the crankshaft 7 based on the output signal from the crank angle sensor 40 corresponds to a process executed by a reverse rotation detection unit.

The operation of the crank counter CR during forward rotation and reverse rotation of the crankshaft 7 will now be described with reference to FIG. 5.

Figure 5:
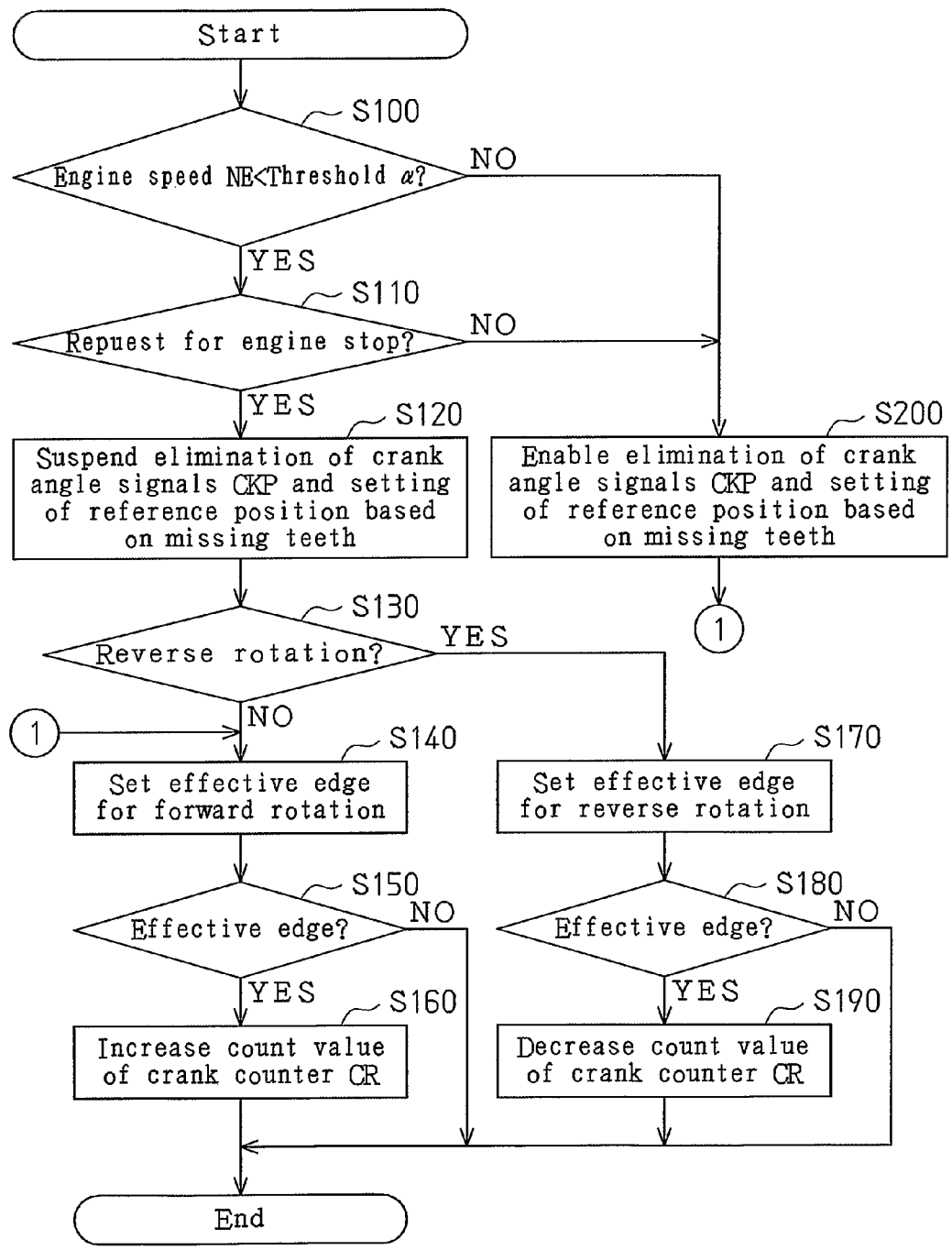
FIG. 5 is a flowchart showing a crank counter setting process in the first embodiment.

FIG. 5 shows the procedures for setting the crank counter CR during forward rotation and reverse rotation of the crankshaft 7. This process is repeated in predetermined cycles by the ECU 50 Once this process is started, the ECU 50 first determines whether the present engine speed NE is less than a threshold α (S100). In this step, the likelihood of reverse rotation of the crankshaft 7 is determined because rotation of the crankshaft is not reversed when the engine speed is high, such as when the engine is in a normal driving state. The threshold α is set at an appropriate value that enables the determination as to whether the present engine speed NE is low enough to cause reverse rotation of the crankshaft 7. In the first embodiment, the threshold α is set at 400 rpm.

When the engine speed NE is greater than or equal to the threshold α (NO in S100), execution of a process for eliminating crank angle signals CKP and a process for setting the reference position based on detection of the teeth missing portion 41b are enabled (S200). Then, an effective edge for forward rotation is set (S140). The effective edge is one of the edges of each tooth 41a. In particular, the effective edge is the edge that changes the count value of the crank counter CR. The edge that causes the pulse signal of the crank angle signal CKP, which has undergone the signal elimination process, to fall is set as the effective edge for forward rotation. In other words, the edge detected when the output level of the signal shifts from a high level to a low level is set as the effective edge for forward rotation.

Next, the ECU 50 determines whether an effective edge has been detected by the crank angle sensor 40 (S150). When the effective edge for forward rotation has not been detected (NO in S150), the process is temporarily terminated. When the effective edge for forward rotation is detected (YES in S150), the count value of the crank counter CR is increased (S160). The count value of the crank counter CR is incremented, for example, by three. In other words, the count value of the crank counter CR is increased by an amount corresponding to a crank angle of 30° CA. The process is then temporarily terminated.

When the engine speed NE is less than the threshold α in step S100 (YES in S100), the ECU 50 determines whether a request to stop the engine (engine stop request) has been given (S110). The ECU 50 may determine that the engine stop request has been given in such cases as when the ignition switch is turned off or when an automatic stop request has been given in a vehicle provided with a function for automatically starting or stopping the engine. When the engine stop request has not been given (NO in S110), the same processing is performed as the processing performed when the determination result in step S100 is negative.

When the engine speed NE is less than the threshold α and the engine stop request has been given (YES in S110), the ECU 50 determines that there is a high possibility of the rotation of the crankshaft 7 being reversed. Thus, the ECU 50 suspends the process for eliminating crank angle signals CKP and the process for setting the reference position setting process based on detection of the teeth missing portion 41b (S120). The process for eliminating the crank angle signal CKP is suspended for the reasons described below.

Rotation of the crankshaft 7 is normally reversed when the engine speed NE is lower than a predetermined level, that is, when the engine is being driven at a low speed such as when stopping the engine. The process for eliminating crank angle signals CKP is suspended when the engine speed NE is less than the predetermined threshold α to enable detection of reverse rotation of the crankshaft 7 based on crank angle signals CKP that have not undergone the signal elimination process. Thus, the detection resolution of the crank angle is high when the engine is being driven at a low speed. This enables the reverse rotation of the crankshaft 7 to be detected accurately. When the engine is being driven at a low speed, crank angle signals CKP are output in relatively long intervals. This provides sufficient time for the calculation of the crank angle based on a crank angle signal CKP. Thus, even though the signal elimination process is not performed when the engine speed is low, the calculation load for detecting the crank angle is not high. In this way, the signal elimination process is suspended and reverse rotation of the crankshaft 7 is detected with high detection resolution of the crank angle when the engine speed NE is less than the threshold α. This enables reverse rotation of the crankshaft 7 to be detected accurately without increasing the calculation load for detecting the crank angle.

The process for setting the reference position based on detection of the teeth missing portion 41b is suspended for the reasons described below. When the crank angle sensor 40 is detecting the teeth missing portion 41b, the absence of the teeth 41a causes a pulse signal, or the crank angle signal CKP, to be output after a relatively long interval as compared with when the crank angle sensor 40 is detecting the existing teeth 41a. The engine speed NE decreases drastically when rotation of the crankshaft 7 is reversed. Thus, when rotation of the crankshaft 7 is reversed, the crank angle sensor 40 that is detecting a tooth 41a may output a crank angle signal CKP after a long interval in the same manner as if the crank angle sensor 40 were detecting the teeth missing portion 41b. Thus, when the engine speed NE is less than the predetermined threshold α, that is, when there is a high possibility of the rotation of the crankshaft 7 being reversed, a reference position signal indicating the teeth missing portion 41b may be erroneously output and the crank counter CR may be erroneously reset based on the output reference position signal. To avoid such a circumstance, the process for setting the reference position based on detection of the teeth missing portion 41b is suspended when the engine speed NE is less than the threshold α. Further, the reference position is set based on the present value of the crank counter CR. More specifically, the crank counter CR is reset when the calculated crank angle, which is based on the count value of the crank counter CR, reaches 360° CA. This prevents the crank angle from being erroneously detected during reverse rotation of the crankshaft 7.

After suspending these processes, the ECU 50 next determines whether the crankshaft 7 is in reverse rotation (S130). The reverse rotation is detected based on whether the above forward/reverse rotation identification signal FL is at a high level or at a low level. When the forward/reverse rotation identification signal FL is at a high level, the crankshaft 7 is determined as being in forward rotation (NO in S130). Thus, steps S140 and S150 are performed. Since the signal elimination process is suspended, the edge detected when a pulse signal of the crank angle signal CKP falls, that is, the edge detected when the output level of the signal shifts from a high level to a low level, is set as the effective edge for forward rotation in step S140. When the effective edge is detected (YES in S150), the count value of the crank counter CR is increased (S160). Since the signal elimination process suspended, the count value of the crank counter CR is increased by one. In other words, the count value of the crank counter CR is increased by an amount corresponding to a crank angle of 10° CA. The process is then temporarily terminated.

When the forward/reverse rotation identification signal FL is at a low level and the crankshaft 7 is in reverse rotation in step S130 (YES in S130), the effective edge for reverse rotation is set (S170). For the crank angle signal CKP that has not undergone the signal elimination process, the edge detected when the pulse signal of the crank angle signal CKP rises, that is, the edge detected when the output level of the signal shifts from a low level to a high level is set as the effective edge for reverse rotation. This edge differs from the edge set as the effective edge for forward rotation. In this way, when reverse rotation of the crankshaft 7 is detected, the effective edge for reverse rotation is set so that the crank counter CR is operated by the other one of the rise timing and the fall timing of the pulse signal that differs from the timing at which the crank counter CR is operated during forward rotation of the crankshaft 7.

Next, the ECU 50 determines whether the effective edge has been detected by the crank angle sensor 40 (S180). When the effective edge for reverse rotation is not detected (NO in S180), the process is temporarily terminated. When the effective edge for reverse rotation is detected (YES in S180), the crank counter CR is decreased (S190). Since the signal elimination process is suspended, the value of the crank counter CR is decreased by one. In other words, the counter value of the crank counter CR is decreased by an amount corresponding to a crank angle of 10° CA. The process is then temporarily terminated.

Figure 6:
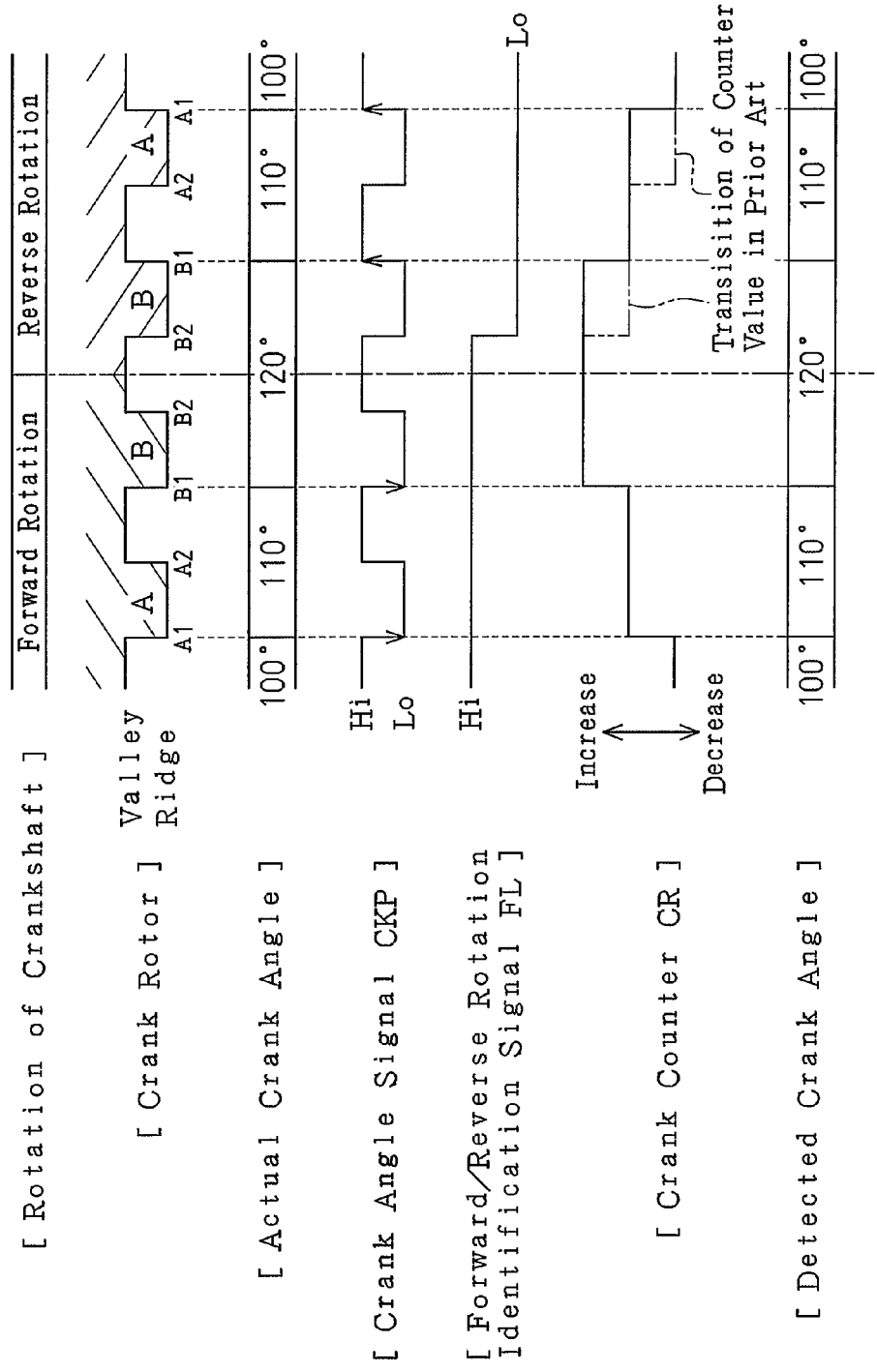
FIG. 6 is an explanatory diagram showing one example of crank angle detection in relation with the crank counter setting process of FIG. 5.

FIG. 6 shows as an example of crank angle detection in relation with the crank counter setting process. FIG. 6 particularly shows the detection in which the crank angle signal CKP elimination process is suspended due to low engine speed. In FIG. 6, in the plurality of teeth 41*a*, the actual crank angle corresponding to a tooth A is 110° CA.

As shown in FIG. 6, during forward rotation of the crankshaft 7, the crank angle signal CKP falls when one edge (first edge) A1 of the tooth A of the crank rotor 41 passes the vicinity of the crank angle sensor 40, and the crank angle signal CKP rises when the other edge (second edge) A2 of the tooth A passes the vicinity of the crank angle sensor 40. Then, when the crankshaft 7 rotates by a crank angle of 10° CA after the first edge A1 of the tooth A passes the vicinity of the crank angle sensor 40 and the actual crank angle becomes 120° CA, one edge (first edge) B1 of the tooth B, which is arranged adjacent to the tooth A, passes the vicinity of the crank angle sensor 40 so that the crank angle signal CKP falls. During forward rotation of the crankshaft 7, an edge detected when the pulse signal of the crank angle signal CKP falls, that is, an edge detected when the output level of the signal shifts from a high level to a low level, is set as the effective edge. Thus, the count value of the crank counter CR is increased and 10° CA is added to the crank angle whenever the crank angle signal CKP falls. When the crank angle detected in correspondence with the first edge A1 of the tooth A is 110° CA, the crank angle detected in correspondence with the first edge B1 of the tooth B is 120° CA. In this case, the actual crank angle and the detected crank angle of the crankshaft 7 coincide with each other.

When rotation of the crankshaft 7 is reversed after the other edge (second edge B2) of the tooth B passes the vicinity of the crank angle sensor 40, that is, when rotation of the crankshaft 7 is reversed while the crank angle sensor 40 is detecting the valley section of the crank rotor 41, the second edge B2 of the tooth B passes by the vicinity of the crank angle sensor 40 again. The crank angle sensor 40 detects passage of the tooth B. The crank angle signal CKP falls in synchronization with the passage of the second edge B2.

If the effective edge is not changed for forward rotation and reverse rotation like in the prior art, the crank counter CR would be decreased in synchronization with the passage of the second edge B2 as indicated by the double-dashed line in FIG. 6. In other words, the crank angle detected in synchronization with the passage of the second edge B2 would be 110° CA. However, the actual crank angle is 110° CA when the first edge B1 of the tooth B passes the vicinity of the crank angle sensor 40. Thus, the actual crank angle and the detected crank angle deviate from each other by an angle corresponding to the width of the tooth B. As a result, the crank angle would not be accurately detected.

However, in the first embodiment, the effective edge is changed for forward rotation and reverse rotation. When reverse rotation of the crankshaft 7 is recognized based on a low level forward/reverse rotation identification signal FL, the edge detected when the pulse signal of the crank angle signal CKP rises is set as the effective edge that operates the crank counter CR. In other words, the edge detected when the output level of the crank angle signal CKP shifts from a low level to a high level is set as the effective edge. Thus, even if the rotation of the crankshaft 7 is reversed and the second edge B2 of the tooth B passes by the vicinity of the crank angle sensor 40 again thereby causing the crank angle signal CKP to fall, the crank counter CR is not decreased in synchronization with the fall of the signal. The crank counter CR is decreased when the crankshaft 7 further rotates by an angle corresponding to the width of the tooth B. In other words, when the first edge B1 of the tooth B passes by the vicinity of the crank angle sensor 40 and the crank angle signal CKP rises in synchronization with the passage of the first edge B1, the crank counter CR is decreased and 10° CA is subtracted from the detected crank angle. The actual crank angle is 120° CA when rotation of the crankshaft 7 is reversed. The actual crank angle then becomes 110° CA when the first edge B1 of the tooth B passes by the vicinity of the crank angle sensor 40. The detected crank angle is also subtracted in synchronization with such a change in the actual crank angle. This enables the crank angle to be accurately detected during reverse rotation of the crankshaft 7.

In the first embodiment, the crank counter CR is operated at a different timing depending on whether the crankshaft 7 is in forward rotation or reverse rotation. This improves the detection accuracy of the crank angle during reverse rotation of the crankshaft 7. As described above, the calculation load for detecting the crank angle is prevented from increasing as compared with when both the rise and the fall of the pulse signal of the crank angle signal CKP are monitored or when the waveform of the pulse signal is inverted upon detection of reverse rotation of the crankshaft 7. This improves crank angle detection accuracy during reverse rotation of the crankshaft 7 without increasing the calculation load for detecting the crank angle.

The reverse rotation detector of the first embodiment has the advantages described below.

(1) The process for eliminating the crank angle signal CKP is suspended when the engine speed NE is less than the predetermined threshold α. In this case, reverse rotation of the crankshaft 7 is detected based on the pulse signal of the crank angle signal CKP that has not undergone the elimination process. Thus, the detection resolution of the crank angle is high and reverse rotation of the crankshaft 7 is accurately detected when the engine speed is low. When the engine speed is low, the crank angle signal CKP is output after a relatively long interval. Thus, sufficient time for the calculation of the crank angle based on a crank angle signal CKP is ensured. Therefore, even if the signal elimination process is suspended when the engine speed is low, the calculation load for detecting the crank angle is prevented from increasing. This improves the detection accuracy during reverse rotation of the crankshaft 7 without increasing the calculation load for detecting the crank angle.

(2) The crank counter CR is operated at a timing that is synchronized with a shift in the output level of the pulse signal of the crank angle signal CKP. Further, the crank counter CR is operated at a different timing depending on whether the crankshaft 7 is in forward rotation or reverse rotation. Thus, the crank angle, which is detected in correspondence with the fall of the signal during forward rotation of the crankshaft 7, is detected in correspondence with the rise of the signal during reverse rotation of the crankshaft 7. As a result, the actual crank angle and the detected crank angle coincide with each other during reverse rotation of the crankshaft 7. This enables the crank angle to be detected accurately during reverse rotation of the crankshaft 7.

In the first embodiment, the crank counter CR is operated at a different timing depending on whether the crankshaft 7 is in forward rotation or reverse rotation. This improves the detection accuracy of the crank angle during reverse rotation of the crankshaft 7. This improves detection accuracy of the crank angle during reverse rotation of the crankshaft 7 without increasing the calculation load for detecting the crank angle.

(3) The crank counter CR is operated at the fall timing of the pulse signal of the crank angle signal CKP during forward rotation of the crankshaft 7. Further, the crank counter CR is operated at the rise timing of the pulse signal, which differs from the timing at which the crank counter CR is operated during forward rotation of the crankshaft 7, when reverse rotation of the crankshaft 7 is recognized. In this way, the crank counter CR is operated at a different timing depending on whether the crankshaft 7 is in forward rotation or reverse rotation.

(4) The crank angle sensor 40 includes the first detection unit and the second detection unit. The first detection unit detects passage of one tooth 41a and outputs a pulse signal corresponding to the tooth 41a. The second detection unit detects passage of the same tooth 41a, which has been detected by the first detection unit, and outputs a pulse signal corresponding to the tooth 41a. During forward rotation of the crankshaft 7, a pulse signal is first output from the first detection unit, and then a pulse signal is output from the second detection unit. During reverse rotation of the crankshaft 7, a pulse signal is first output from the second detection unit, and then a pulse signal is output from the first detection unit. In this way, the corresponding relationship between the output level of the first detection unit and the output level of the second detection unit during forward rotation of the crankshaft 7 differs from the corresponding relationship between the output level of the first detection unit and the output level of the second detection unit during reverse rotation of the crankshaft 7. In the first embodiment, reverse rotation of the crankshaft 7 is detected based on the corresponding relationship between the output levels. More specifically, during reverse rotation of the crankshaft 7, the output level of the second detection unit first shifts, and then the output level of the first detection unit shifts. Thus, when the output level of the first detection unit and the output level of the second detection unit coincide with each other immediately after the output level of the first detection unit shifts, the crankshaft 7 is determined as being in reverse rotation. This ensures detection of reverse rotation of the crankshaft 7.

A reverse rotation detector for an internal combustion engine according to a second embodiment of the present invention will now be described with reference to FIGS. 7A to 10.

In the second embodiment, two kinds of crank angle signals, namely, a crank angle signal FCKP for forward rotation and a crank angle signal RCKP for reverse rotation, are output based on an output signal from the first detection unit.

The operation timing of the crank counter CR is set in advance in the manner described below. The crank counter CR is operated at the fall timing of the pulse signals in the forward rotation crank angle signal FCKP. The crank counter CR is operated at the rise timing of the pulse signals in the reverse rotation crank angle signal RCKP, that is, at a timing differing from the timing the crank counter CR is operated by the forward rotation crank angle signal FCKP.

In this manner, except in that two kinds of crank angle signals are output from the crank angle sensor 40, and the operation timing of the crank counter CR is set in advance at different timings for the forward rotation crank angle signal and the reverse rotation crank angle signal, the second embodiment is the same as the first embodiment.

The reverse rotation detector for an internal combustion engine according to the second embodiment will now be described focusing on its differences from the first embodiment.

First, the output of the forward rotation crank angle signal FCKP and the reverse rotation crank angle signal RCKP will be described.

During forward rotation of the crankshaft 7, the forward rotation crank angle signal FCKP is output from the first detection unit as a pulse signal, of which output level shifts in the same manner as the crank angle signal CKP. However, when reverse rotation of the crankshaft 7 is being detected, the forward rotation crank angle signal FCKP is output as a signal held at a high level, that is, a signal having a constant level. The operation timing of the crank counter CR is set in advance so that when the forward rotation crank angle signal FCKP is output as a pulse signal, the counter value of the crank counter CR is increased at the fall timing of the pulse signal. In this way, the effective edge for forward rotation is set in advance for the forward rotation crank angle signal FCKP in the same manner as described above.

During forward rotation of the crankshaft 7, the reverse rotation crank angle signal RCKP is output as a signal held at a low level, that is, a signal having a constant level. However, when reverse rotation of the crankshaft 7 is being detected, the reverse rotation crank angle signal RCKP is output from the first detection unit as a pulse signal, of which output level shifts in the same manner as the crank angle signal CKP. The operation timing of the crank counter CR is set in advance so that when the reverse rotation crank angle signal FCKP is output as a pulse signal, the counter value of the crank counter CR is decreased at the rise timing of the pulse signal. In other words, the crank counter CR is operated at a timing that differs from the forward rotation crank angle signal FCKP. In this way, the effective edge for reverse rotation is set in advance for the reverse rotation crank angle signal FCKP in the same manner as described above.

Figure 7A:
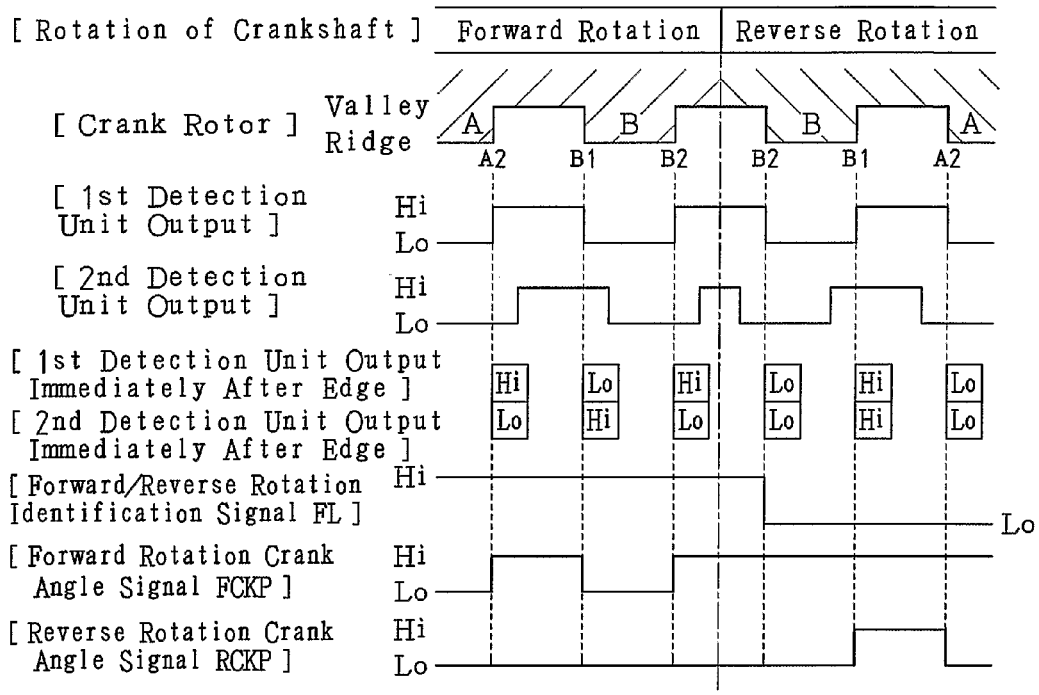
FIG. 7A is an explanatory diagram of the outputting state of a forward rotation crank angle signal and a reverse rotation crank angle signal in a second embodiment of the present invention in which the crankshaft shifts from forward rotation to reverse rotation while the crank angle sensor is detecting a valley section of the crank rotor.
Figure 7B:
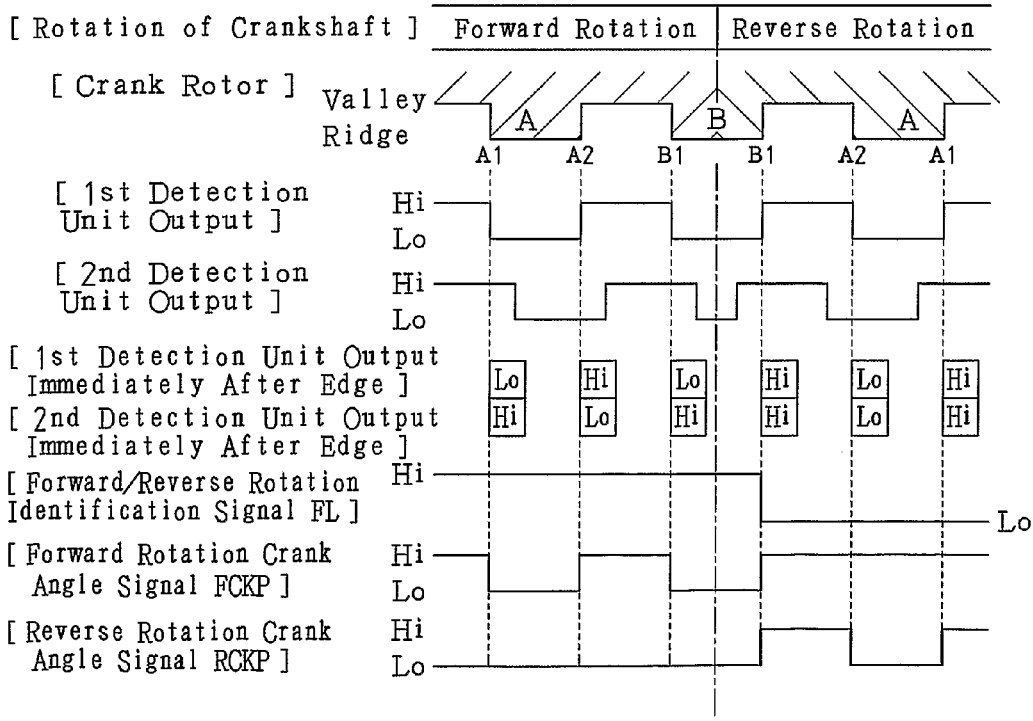
FIG. 7B is an explanatory diagram of the output from a forward rotation crank angle signal and a reverse rotation crank angle signal in the second embodiment in which the crankshaft shifts from forward rotation to reverse rotation while the crank angle sensor is detecting a ridge section of the crank rotor.

FIGS. 7A and 7B show the output of the forward rotation crank angle signal FCKP and the reverse rotation crank angle signal RCKP in a manner added to FIG. 4, which shows the detection of reverse rotation. FIG. 7A shows the output of each crank angle signal when the rotation of the crankshaft 7 is reversed in a state a valley section 41c is being detected by the crank angle sensor 40. In other words, FIG. 7A shows the output of each crank angle signal when the rotation of the crankshaft 7 is reversed after the first detection unit detects the second edge B2 of tooth B. In the same manner, FIG. 7B shows the output of each crank angle signals when the rotation of the crankshaft 7 is reversed in a state a ridge section (tooth 41a) is being detected by the crank angle sensor 40. In other words, FIG. 7B shows the output of each crank angle signal when the rotation of the crankshaft 7 is reversed in a state the first detection unit is detecting the tooth B.

As shown in FIG. 7A, during forward rotation of the crankshaft 7, the forward rotation crank angle signal FCKP is output as a pulse signal that is synchronized with the output of the first detection unit. When the rotation of the crankshaft 7 is reversed and the forward/reverse rotation identification signal FL shifts to a low level at a timing corresponding to the second edge B2 of the tooth B, the forward rotation crank angle signal FCKP is output as a signal held at a high level.

During forward rotation of the crankshaft 7, the reverse rotation crank angle signal RCKP is output as a signal held at a low level. When the rotation of the crankshaft 7 is reversed and the forward/reverse rotation identification signal FL shifts to a low level at a timing corresponding to the second edge B2 of the tooth B, the reverse rotation crank angle signal FCKP is output as a pulse signal that is synchronized with the output of the first detection unit. In the state shown in FIG. 7A, the count value of the crank counter CR is increased based on the forward rotation crank angle signal FCKP until the first detection unit detects the second edge B2 of the tooth B when the rotation of the crankshaft 7 is reversed. Once the first detection unit detects the second edge B2 of the tooth B when the rotation of the crankshaft 7 is reversed, the count value of the crank counter CR is decreased based on the reverse rotation crank angle signal RCKP.

In the same manner, in the state shown in FIG. 7B, the count value of the crank counter CR is increased based on the forward rotation crank angle signal FCKP before the first detection unit detects the first edge B1 of the tooth B when the rotation of the crankshaft 7 is reversed. Once the first detection unit detects the first edge B1 of the tooth B during reverse rotation of the crankshaft 7, the count value of the crank counter CR is decreased based on the reverse rotation crank angle signal RCKP.

When the rotation of the crankshaft 7 is once reversed and then returned to the forward direction, the detection of the rotation direction and the output of each crank angle signal are performed based on the same principle as described above. Although not described in detail here, the detection of the rotation direction and the output of the crank angle signal are shown in FIGS. 8A and 8B in the same manner as in FIGS. 7A and 7B.

Figure 8A:
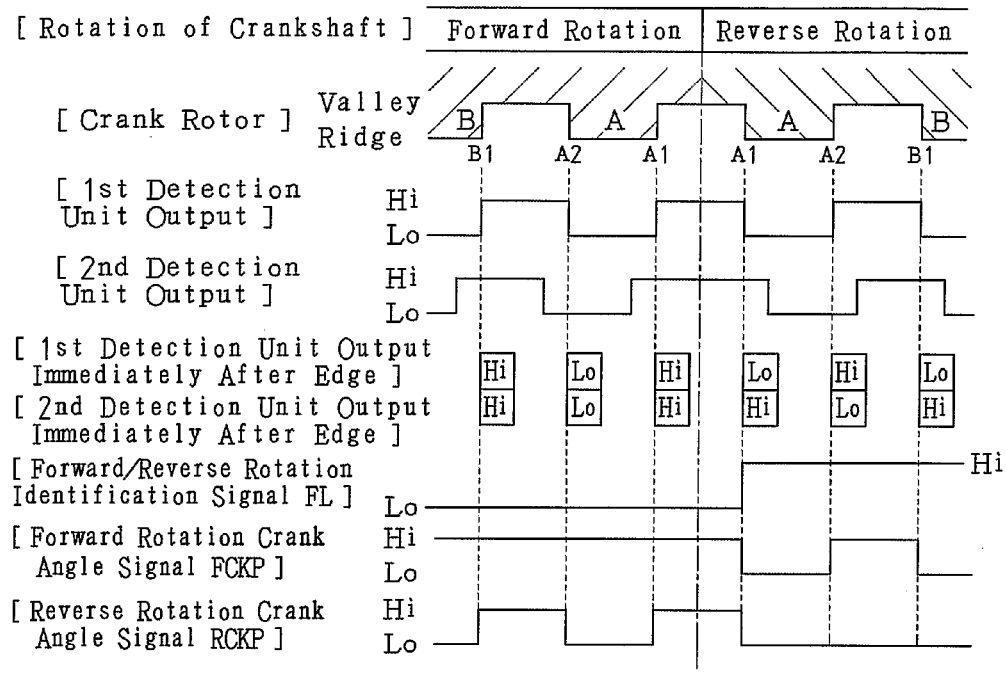
FIG. 8A is an explanatory diagram of the output from a forward rotation crank angle signal, a reverse rotation crank angle signal, and a forward/reverse rotation identification signal in the second embodiment in which the crankshaft shifts from reverse rotation to forward rotation while the crank angle sensor is detecting a valley section of the crank rotor.
Figure 8B:
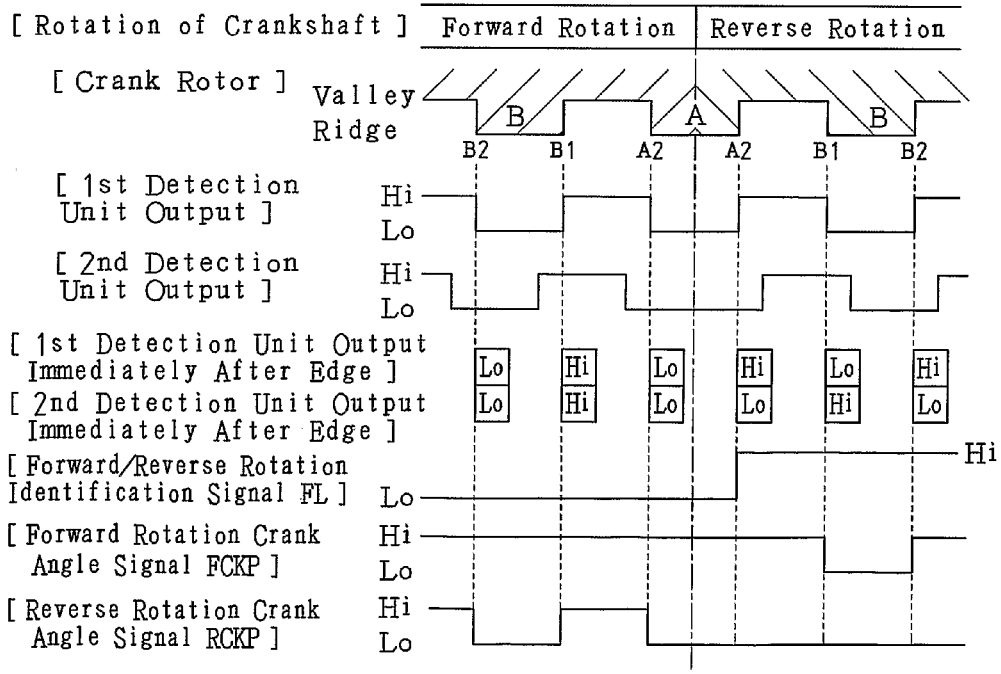
FIG. 8B is an explanatory diagram of the output from a forward rotation crank angle signal, a reverse rotation crank angle signal, and a forward/reverse rotation identification signal in the second embodiment in which the crankshaft shifts from reverse rotation to forward rotation while the crank angle sensor is detecting a ridge section of the crank rotor.

FIG. 8A shows a state in which the crankshaft 7 shifts from reverse rotation to forward rotation when the crank angle sensor 40 is detecting a valley section 41c. That is, FIG. 8A shows the shifting of the forward/reverse rotation identification signal FL and the output of each crank angle signal when the crankshaft 7 shifts from reverse rotation to forward rotation after the first detection unit detects the first edge A1 of a tooth A. In the same manner, FIG. 8B shows a state in which the crankshaft 7 shifts from reverse rotation to forward rotation when the crank angle sensor 40 is detecting a ridge section (tooth 41a). That is, FIG. 8B shows the shifting of the forward/reverse rotation identification signal FL and the output of each crank angle signal when the crankshaft 7 shifts from reverse rotation to forward rotation in a state in which the first detection unit is detecting the tooth A.

As shown in FIG. 8A, during reverse rotation of the crankshaft 7, the forward rotation crank angle signal FCKP is output as a signal held at a high level. When the crankshaft 7 shifts to forward rotation and the forward/reverse rotation identification signal FL shifts from a low level to a high level at a timing corresponding to the first edge A1 of the tooth A, the forward rotation crank angle signal FCKP is output as a pulse signal that is synchronized with the output of the first detection unit.

During reverse rotation of the crankshaft 7, the reverse rotation crank angle signal RCKP is output as a pulse signal that is synchronized with the output of the first detection unit. When the crankshaft 7 shifts to forward rotation and the forward/reverse rotation identification signal FL shifts to a high level at a timing corresponding to the first edge A1 of the tooth A, the reverse rotation crank angle signal RCKP is output as a signal held at a low level. In the state shown in FIG. 8A, the count value of the crank counter CR is decreased based on the reverse rotation crank angle signal RCKP until the crankshaft 7 shifts to forward rotation and the first detection unit detects the first edge A1 of the tooth A. Once the crankshaft 7 shifts to forward rotation and the first detection unit detects the first edge A1 of the tooth A, the count value of the crank counter CR is increased based on the forward rotation crank angle signal FCKP.

In the same manner, in the state shown in FIG. 8B, the count value of the crank counter CR is decreased based on the reverse rotation crank angle signal RCKP until the crankshaft 7 shifts to forward rotation and the first detection unit detects the second edge A2 of the tooth A. Once the crankshaft 7 shifts to forward rotation and the first detection unit detects the second edge A2 of the tooth A, the count value of the crank counter CR is decreased based on the forward rotation crank angle signal FCKP.

The operation of the crank counter CR during forward rotation and reverse rotation of the crankshaft 7 in the second embodiment will now be described with reference to FIG. 9. The process for setting the crank counter in the second embodiment only partially differs from the process shown in FIG. 5. In FIG. 9, the same steps as the steps shown in FIG. 5 are denoted with the same reference numerals.

Once the process shown in FIG. 9 is started, the ECU 50 first determines whether the present engine speed NE is less than a threshold $\alpha$ (S100).

When the engine speed is greater than or equal to the threshold $\alpha$ (NO in S100), the process for eliminating forward rotation crank angle signals FCKP and the process for setting the reference position based on detection of the teeth missing portion 41b are enabled (S330). In the second embodiment, the subject of execution and suspension of the elimination process is the forward rotation crank angle signal FCKP. The elimination process is not performed on the reverse rotation crank angle signal RCKP. This is to improve the detection accuracy of the crank angle during reverse rotation of the crankshaft 7.

Next, the ECU 50 determines whether an effective edge for the forward rotation crank angle signal FCKP has been detected by the crank angle sensor 40, that is, whether the fall of the pulse signal indicating detection of an effective edge for forward rotation is detected (S310). When the effective edge has not been detected (NO in S310), the process is temporarily terminated. When the effective edge is detected (YES in S310), the count value of the crank counter CR is increased (S160). The count value of the crank counter CR is increased by three. In other words, the count value of the crank counter CR is increased by an amount corresponding to a crank angle of 30° CA. The process is then temporarily terminated.

When the engine speed NE is less than the threshold $\alpha$ in step S100 (YES in S100), the ECU 50 determines whether the engine stop request has been given (S110). If the engine stop request has not been given (NO in S110), the same processing performed is performed as when the determination result in step S100 is negative.

When the engine speed NE is less than the threshold $\alpha$ and the engine stop request has been given (YES in S110), the process for eliminating forward rotation crank angle signals FCKP and the process for setting the reference position setting process based on detection of the teeth missing portion 41b are suspended (S300). These processes are suspended for the reasons described above.

After these processes are suspended, the ECU 50 next determines whether the crankshaft 7 is in reverse rotation (S130). When the forward/reverse rotation identification signal FL is at a high level, the crankshaft 7 is determined as being in forward rotation (NO in S130). Thus, the processing in steps S310 and S160 are performed. When an effective edge is detected (YES in S310), the counter value of the crank counter CR is increased in step S160. Since the signal elimination process is suspended, the counter value of the crank counter CR is increased by one. In other words, the counter value of the crank counter CR is increased by an amount corresponding to a crank angle of 10° CA. The process is then temporarily terminated.

When the forward/reverse rotation identification signal FL is at a low level and the crankshaft 7 is determined as being in reverse rotation in step S130 (YES in S130), the ECU 50 determines whether an effective edge for reverse rotation crank angle signal RCKP has been detected by the crank angle sensor 40 (S320). In other words, the ECU 50 determines whether the rise of the pulse signal indicating detection of the effective edge for reverse rotation has been detected. When the effective edge is not detected (NO in S320), the process is temporarily terminated. When the effective edge is detected (YES in S320), the counter value of the crank counter CR is decreased (S190). Since the elimination process is suspended, the counter value of the crank counter is decreased by one. In other words, the counter value of the crank counter CR is decreased by an amount corresponding to a crank angle of 10° CA. The process is then temporarily terminated.

Figure 10:
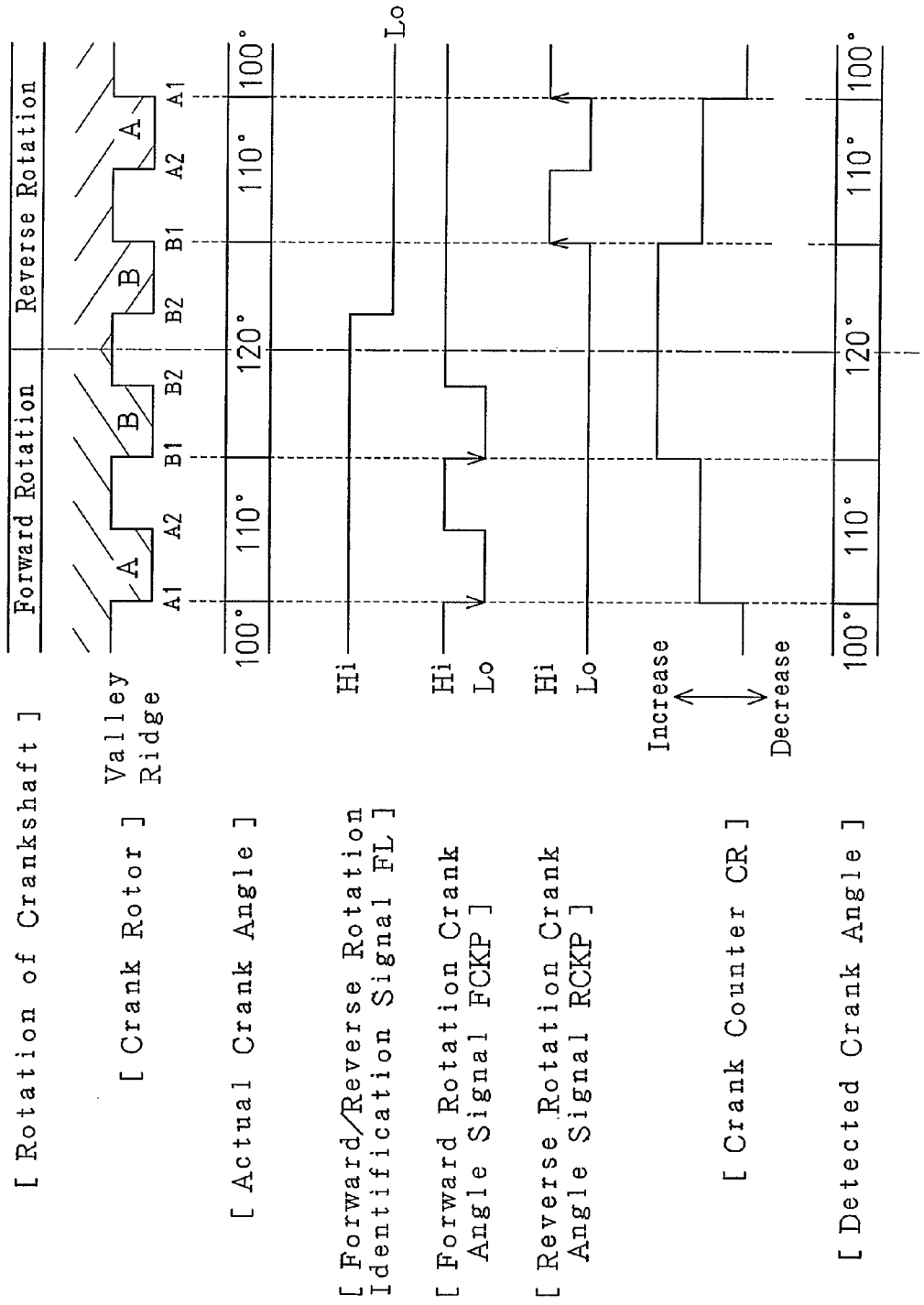
FIG. 10 is an explanatory diagram showing one example of a crank angle detection in relation with the crank counter setting process of FIG. 9.
Figure 11:
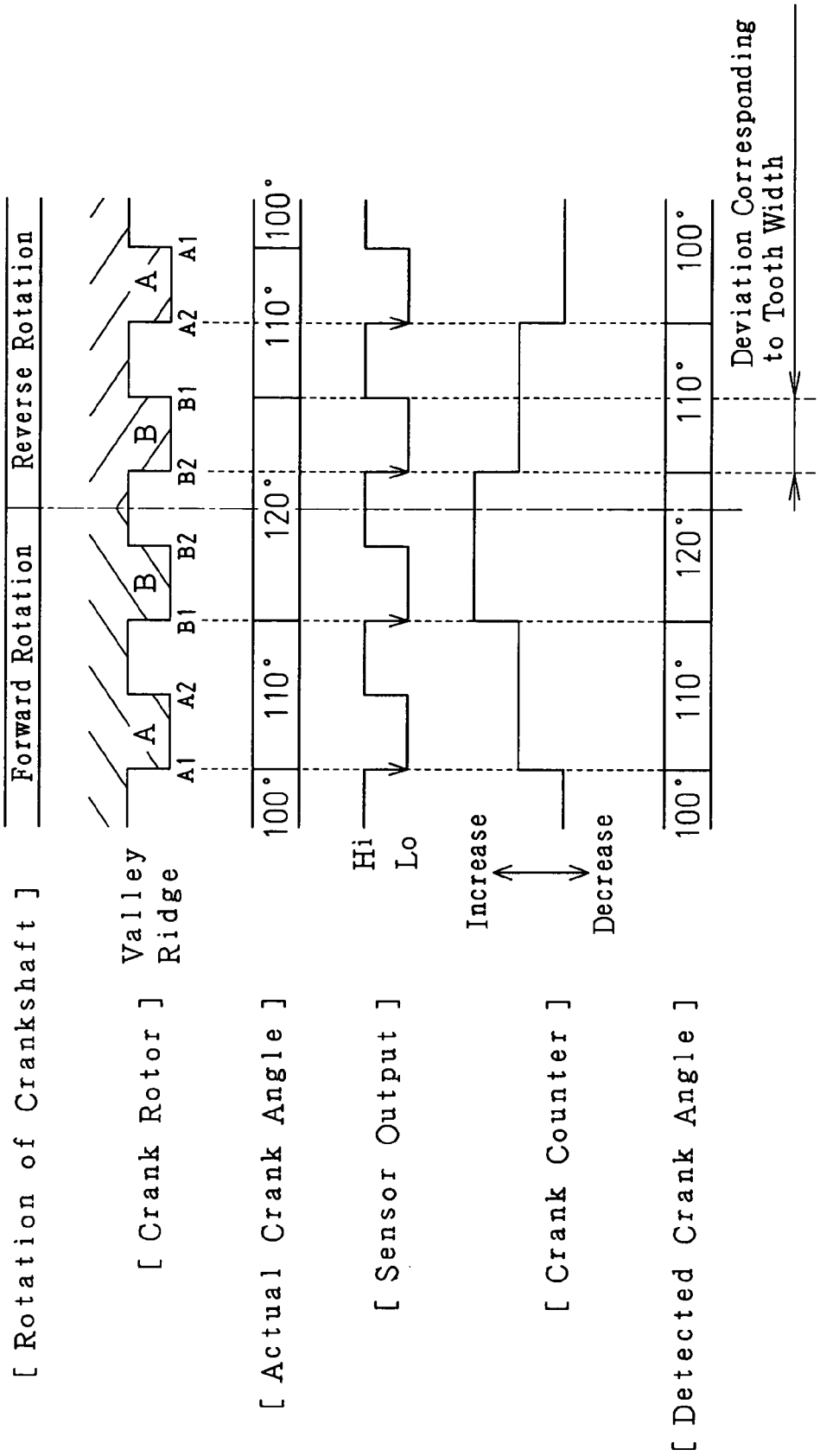
FIG. 11 is an explanatory diagram showing one example a crank angle detection in the prior art.

FIG. 10 shows one example of the detection of the crank angle during the crank counter setting process. FIG. 10 particularly shows the detection when the forward rotation crank angle signal FCKP elimination process is suspended because the engine speed is low. In FIG. 10, in the plurality of teeth 41a, the actual crank angle corresponding to tooth A is 110° CA.

As shown in FIG. 10, during forward rotation of the crankshaft 7, the forward rotation crank angle signal FCKP falls when the first edge A1 of the tooth A of the crank rotor 41 passes by the vicinity of the crank angle sensor 40, and the forward rotation crank angle signal FCKP rises when the second edge A2 of the tooth A of the crank rotor 41 passes by the vicinity of the crank angle sensor 40. When the crankshaft 7 rotates by a crank angle of 10° CA after the first edge A1 of the tooth A passes by the vicinity of the crank angle sensor 40 and the actual crank angle becomes 120° CA, the first edge B1 of the tooth B, which is arranged adjacent to the tooth A, passes by the vicinity of the crank angle sensor 40 so that the forward rotation crank angle signal FCKP falls. During forward rotation of the crankshaft 7, the edge detected when the pulse signal of the forward rotation crank angle signal FCKP falls, that is, the edge detected when the output level of the pulse signal shifts from a high level to a low level, is set in advance as the effective edge. Thus, the count value of the crank counter CR is increased and 10° CA is added whenever the forward rotation crank angle signal FCKP falls. When the crank angle detected in correspondence with the first edge A1 of the tooth A is 110° CA, the crank angle detected in correspondence with the first edge B1 of the tooth B is 120° CA. In this case, the actual crank angle and the detected crank angle of the crankshaft 7 coincide with each other.

When rotation of the crankshaft 7 is reversed after the second edge B2 of the tooth B passes by the vicinity of the crank angle sensor 40, that is, when rotation of the crankshaft 7 is reversed while the crank angle sensor 40 is detecting a valley section of the crank rotor 41, the second edge B2 of the tooth B passes by the vicinity of the crank angle sensor 40 again. The reverse rotation of the crankshaft 7 is detected based on a low level forward/reverse rotation identification signal FL. As a result, the crank counter CR is operated based on a shift in the output level of the reverse rotation crank angle signal RCKP. For the reverse rotation crank angle signal RCKP, an edge detected when the pulse signal of the reverse rotation crank angle signal RCKP rises is set in advance as the effective edge that operates the crank counter CR. In other words, the edge detected when the output level of the reverse rotation crank angle signal RCKP shifts from a low level to a high level is set as the effective edge. Thus, during reverse rotation of the crankshaft 7, the crank counter CR is not decreased when the second edge B2 of the tooth B passes by the vicinity of the crank angle sensor 40. The crank counter CR is decreased when the crankshaft 7 further rotates by an angle corresponding to the width of the tooth B. In other words, the crank counter CR is decreased and 10° CA is subtracted from the detected crank angle when the first edge B1 of the tooth B passes by the vicinity of the crank angle sensor 40 and the reverse rotation crank angle signal RCKP rises in synchronization with passage of the first edge B1. The actual crank angle is 120° CA when rotation of the crankshaft 7 is reversed. The actual crank angle then becomes 110° CA when the first edge B1 of the tooth B passes by the vicinity of the crank angle sensor 40. The detected crank angle is also subtracted in synchronization with such a change in the actual crank angle. This enables the crank angle to be accurately detected during reverse rotation of the crankshaft 7.

In the second embodiment, two crank angle signals are output from the crank angle sensor 40. More specifically, the crank angle sensor 40 outputs the forward rotation crank angle signal FCKP, which is output as a pulse signal when the crankshaft 7 is rotating in the forward direction and which is output as a signal having a constant level when the crankshaft 7 is rotating in the reverse direction. Further, the crank angle sensor 40 outputs the reverse rotation crank angle signal RCKP, which is output as a signal having a constant level when the crankshaft 7 is rotating in the forward direction and which is output as a pulse signal when the crankshaft 7 is rotating in the reverse direction.

The operation timing of the crank counter CR is set in advance so that when the forward rotation crank angle signal FCKP is output as a pulse signal, the counter value of the crank counter CR is increased at the fall timing of the pulse signal. When the reverse rotation crank angle signal RCKP is output as a pulse signal, the counter value of the crank counter CR is decreased at the rise timing of the pulse signal, which differs from the timing of the forward rotation crank angle signal FCKP for operating the crank counter CR.

In the second embodiment, when the reverse rotation crank angle signal RCKP is output as a pulse signal, the timing at which the crank counter CR is operated is set at a timing differing from the operation timing of the crank counter CR during forward rotation of the crankshaft 7. Thus, the second embodiment ensures that the crank counter CR is operated at different timings depending on whether the crankshaft 7 is in forward rotation or reverse rotation. The reverse rotation detector of the second embodiment also has the same advantages as the advantages described in the first embodiment.

It should be apparent to those skilled in the art that the present invention may be embodied in many other specific forms without departing from the spirit or scope of the invention. Particularly, it should be understood that the present invention may be embodied in the following forms.

In the above embodiments, the elimination process need not be performed, and the crank angle may always be detected in a state in which the detection resolution of the crank angle is high. In this case, the detection accuracy during reverse rotation of the crankshaft 7 is improved as described in advantage (1). Further, the crank counter CR is operated at a different timing depending on whether the crankshaft 7 is in forward rotation or reverse rotation. Thus, advantages (2) and (3) described in the first embodiment are also obtained. More specifically, detection accuracy during reverse rotation of the output shaft, for example, detection accuracy of the rotation angle of the output shaft during reverse rotation of the output shaft is improved without increasing the calculation load for detecting the crank angle.

In the above embodiments, the crank angle may be detected without performing the processing for setting the operation timing of the crank counter CR at a different timing depending on whether the crankshaft 7 is in forward rotation or reverse rotation. In this case, the advantages described above except advantage (2) are obtained. More specifically, detection accuracy during reverse rotation of the crankshaft 7, for example, detection accuracy of reverse rotation of the crankshaft 7 is improved without increasing the calculation load for detecting the crank angle.

In the above embodiments, the crank counter CR may be operated at the rise timing of the pulse signal during forward rotation of the crankshaft 7, and the crank counter CR may be operated at the fall timing of the pulse signal when reverse rotation of the crankshaft 7 is being detected.

More specifically, the crank counter CR may be operated at either one of the rise timing and the fall timing of the pulse signal during forward rotation of the crankshaft 7. When reverse rotation of the crankshaft 7 is being detected, the crank counter CR may be operated at the other one of the rise timing and the fall timing of the pulse signal that differs from the timing at which the crank angle CR is operated during forward rotation of the crankshaft 7. In this case, the same advantages as the advantages obtained in the above embodiments are obtained.

The first embodiment may be modified in the following form. The operation timing of the crank counter CR may be set so that the crank counter CR is operated at the rise timing of the pulse signal during forward rotation of the crankshaft 7. Then, the operation timing of the crank counter CR may be changed so that the crank counter CR is operated at the fall timing of the pulse signal when reverse rotation of the crankshaft 7 is detected.

The second embodiment may be modified in the following form. The operation timing of the crank counter CR may be set in advance so that when the forward rotation crank angle signal FCKP is a pulse signal, the crank counter CR is operated at the rise timing of the pulse signal. When the reverse rotation crank angle signal RCKP is a pulse signal, the crank counter CR is operated at the fall timing of the pulse signal.

In the second embodiment, the output level of the reverse rotation crank angle signal RCKP is set at a low level during forward rotation of the crankshaft 7, and the output level of the forward rotation crank angle signal FCKP is set at a high level during reverse rotation of the crankshaft 7. However, the output level of the reverse rotation crank angle signal RCKP during forward rotation of the crankshaft 7 and the output level of the forward rotation crank angle signal FCKP during reverse rotation of the crankshaft 7 may have any signal level that is constant.

In the above embodiments, reverse rotation of the crankshaft 7 is detected based on the corresponding relationship between the output level of the first detection unit and the output level of the second detection unit. However, reverse rotation of the crankshaft 7 may be detected in any way based on an output signal from the crank angle sensor.

For example, rotation of the crankshaft 7 is reversed when the engine is stopped. In this case, the engine speed NE gradually decreases and reaches zero. Then, the engine speed NE starts increasing when the reverse rotation is started. Such changes in the engine speed NE are reflected in the duration of the crank angle signal, that is, the pulse signal. Thus, the crankshaft 7 may be determined as being in reverse rotation when the duration of the pulse signal reaches its maximum, that is, when the duration of the pulse signal first increases and then decreases. In this case, the same advantages as the advantages obtained in the above embodiments are obtained.

The processing in step S110 shown in FIGS. 5 and 9, that is, the processing for determining whether the engine stop request has been given, does not have to be performed.

In the above embodiments, the elements that cause a pulse to be generated at every predetermined angle of rotation of the output shaft of the internal combustion engine are the plurality of teeth 41a, which are formed on the circumferential surface of the crank rotor 41. However, any detectable element that causes a pulse to be generated at every predetermined angle of rotation of the output shaft of the internal combustion engine may be used. With the use of such a detectable element, the same advantages as the above embodiments are obtained.

Rotation of the crankshaft 7 is likely to be reversed not only when the engine is stopped but also when the engine is started. The crank counter setting process excluding step S110 may also be performed when the engine is started. In this case, the same advantages as the above embodiments are obtained.

In the above embodiments, the reverse rotation detector of the present invention is applied to a gasoline engine. However, the internal combustion engine to which the reverse rotation detector of the present invention is applied is not limited to gasoline engines. For example, the present invention may be applied to a diesel engine or any other type of internal combustion engines.

The invention claimed is:

1. A device for use in an internal combustion engine having an output shaft for detecting reverse rotation of the output shaft, the device comprising:
   a sensor for outputting a pulse signal whenever the output shaft is rotated by a predetermined angle;
   a rotation angle calculation unit for executing an elimination process, in which a predetermined proportion of pulse signals are eliminated from a sequence of the pulse signals, and determining a rotation angle of the output shaft based on a remaining signal obtained through the elimination process; and
   a reverse rotation detection unit for detecting reverse rotation of the output shaft based on the pulse signals;
   wherein when rotation speed of the output shaft becomes lower than a predetermined threshold, the rotation angle calculation unit suspends the elimination process and determines the rotation angle of the output shaft based on the pulse signals that have not undergone the elimination process, and the reverse rotation detection unit detects reverse rotation of the output shaft based on the pulse signals that have not undergone the elimination process.

2. The device according to claim 1, wherein the reverse rotation detection unit detects reverse rotation of the output shaft when duration of the pulse signal starts to decrease after having been increasing.

3. The device according to claim 1, wherein:
   the output shaft includes a rotor integrally rotated with the output shaft, the rotor having a plurality of detectable elements arranged at predetermined angular intervals in the rotation direction of the output shaft;
   the sensor includes a first detection unit and a second detection unit, each generating the pulse signal whenever any one of the detectable elements passes by, the second detection unit generating a pulse signal in correspondence with each detectable element after a delay from when the first detection unit generates the pulse signal as the output shaft rotates in the forward direction; and the reverse rotation detection unit detects reverse rotation of the output shaft based on a corresponding relationship between the pulse signal generated by the first detection unit and the pulse signal generated by the second detection unit.

4. The device according to claim 3, wherein the reverse rotation detection unit detects reverse rotation of the output shaft based on the corresponding relationship between the pulse signal generated by the first detection unit and the pulse signal generated by the second detection unit differing during forward rotation and reverse rotation of the output shaft.

5. The device according to claim 3, wherein the reverse rotation detection unit detects reverse rotation of the output shaft when the signal generated by the first detection unit and the signal generated by the second detection unit have the same level immediately after the level of the signal generated by the first detection unit shifts.

6. The device according to claim 3, wherein the reverse rotation detection unit detects reverse rotation of the output shaft when the signal generated by the first detection unit and the signal generated by the second detection unit have different levels immediately after the level of the signal generated by the second detection unit shifts.

7. A device for use in an internal combustion engine having an output shaft for detecting reverse rotation of the output shaft, the device comprising:

a sensor for outputting a pulse signal whenever the output shaft is rotated by a predetermined angle;

a rotation angle calculation unit including a counter for performing a count operation in synchronism with rising or falling of the pulse signal, the rotation angle calculation unit determining a rotation angle of the output shaft based on a count value of the counter; and a reverse rotation detection unit for detecting reverse rotation of the output shaft based on the pulse signals;

wherein the rotation angle calculation unit has the counter perform the count operation in synchronism with one of the rising and falling of the pulse signal when the output shaft is rotating in a forward direction, and the rotation angle calculation unit has the counter perform the count operation in synchronism with the other one of the rising and falling of the pulse signal when the reverse rotation detection unit detects reverse rotation of the output shaft.

8. The device according to claim 7, wherein the rotation angle calculation unit increases the count value of the counter when the output shaft is rotating in the forward direction, and the rotation angle calculation unit decreases the count value of the counter when the reverse rotation detection unit detects reverse rotation of the output shaft.

9. The device according to claim 7, wherein:

the sensor is configured to enable output of a forward rotation signal and a reverse rotation signal;

the forward rotation signal is output as the pulse signal when the output shaft is rotating in the forward direction and output as a signal having a constant level when the output shaft is rotating in the reverse direction;

the reverse rotation signal is output as a signal having a constant level when the output shaft is rotating in the forward direction and output as the pulse signal when the output shaft is rotating in the reverse direction;

when the forward rotation signal is output as the pulse signal, the rotation angle calculation unit has the counter perform the count operation in synchronism with one of the rising and falling of the pulse signal; and when the reverse rotation signal is output as the pulse signal, the rotation angle calculation unit has the counter perform the count operation in synchronism with the other one of the rising and falling of the pulse signal.

10. The device according to claim 7, wherein the reverse rotation detection unit detects reverse rotation of the output shaft when duration of the pulse signal starts to decrease after having been increasing.

11. The device according to claim 7, wherein:

the output shaft includes a rotor integrally rotated with the output shaft, the rotor having a plurality of detectable elements arranged at predetermined angular intervals in the rotation direction of the output shaft;

the sensor includes a first detection unit and a second detection unit, each generating the pulse signal whenever any one of the detectable elements passes by, the second detection unit generating a pulse signal in correspondence with each detectable element after a delay from when the first detection unit generates the pulse signal as the output shaft rotates in the forward direction; and the reverse rotation detection unit detects reverse rotation of the output shaft based on a corresponding relationship between the pulse signal generated by the first detection unit and the pulse signal generated by the second detection unit.

12. The device according to claim 11, wherein the reverse rotation detection unit detects reverse rotation of the output shaft based on the corresponding relationship between the pulse signal generated by the first detection unit and the pulse signal generated by the second detection unit differing during forward rotation and reverse rotation of the output shaft.

13. The device according to claim 11, wherein the reverse rotation detection unit detects reverse rotation of the output shaft when the signal generated by the first detection unit and the signal generated by the second detection unit have the same level immediately after the level of the signal generated by the first detection unit shifts.

14. The device according to claim 11, wherein the reverse rotation detection unit detects reverse rotation of the output shaft when the signal generated by the first detection unit and the signal generated by the second detection unit have different levels immediately after the level of the signal generated by the second detection unit shifts.

* * * * *